(12) United States Patent
Moore et al.

(10) Patent No.: US 11,459,986 B2
(45) Date of Patent: Oct. 4, 2022

(54) OBROUND FILTER ELEMENT

(71) Applicant: Baldwin Filters, Inc., Kearney, NE (US)

(72) Inventors: Jonathan D. Moore, Manchester, CT (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 308 days.

(21) Appl. No.: 16/580,131

(22) Filed: Sep. 24, 2019

(65) Prior Publication Data
US 2020/0095964 A1    Mar. 26, 2020

Related U.S. Application Data

(60) Provisional application No. 62/735,383, filed on Sep. 24, 2018.

(51) Int. Cl.
| | | |
|---|---|---|
| *F02M 37/34* | (2019.01) | |
| *B01D 46/00* | (2022.01) | |
| *B01D 46/52* | (2006.01) | |

(52) U.S. Cl.
CPC ......... *F02M 37/34* (2019.01); *B01D 46/0012* (2013.01); *B01D 46/521* (2013.01)

(58) Field of Classification Search
None
See application file for complete search history.

(56) References Cited

U.S. PATENT DOCUMENTS

| | | | | |
|---|---|---|---|---|
| 2,072,906 | A * | 3/1937 | Rosenberger | B01D 46/58 55/300 |
| 3,297,161 | A * | 1/1967 | Kasten | F02M 37/54 210/114 |
| 4,491,120 | A * | 1/1985 | Hodgkins | F02M 31/16 210/186 |

(Continued)

FOREIGN PATENT DOCUMENTS

| | | |
|---|---|---|
| DE | 102010031341 A1 | 1/2012 |
| EP | 3141293 A1 * | 3/2017 ........... B01D 17/045 |

(Continued)

OTHER PUBLICATIONS

European Search Report for Application No. 19199345.0-1104 dated Feb. 10, 2020; 6 pgs.

*Primary Examiner* — Robert J Popovics
(74) *Attorney, Agent, or Firm* — Alix, Yale & Ristas, LLP

(57) ABSTRACT

The disclosed filter element is configured for use within a housing of a filter assembly. The filter element includes an obround ring of filter media extending between an upper and lower endcaps and defines a dirty wet fuel region. The upper endcap of the filter element defines an inlet for receiving the dirty wet fuel, which flows into the dirty wet fuel region and radially outward through the filter media. The upper endcap may include an insert to define a flow chamber to distribute fuel into the dirty wet fuel region. A clean wet fuel region is defined outside the filter element and within the housing. After flowing through the inlet and the filter media clean wet fuel fills the clean wet fuel region. A water separator is disposed external to the filter media and defines a clean dry fuel region in communication with an outlet defined by the upper endcap.

8 Claims, 33 Drawing Sheets

(56) References Cited

U.S. PATENT DOCUMENTS

| | | | | |
|---|---|---|---|---|
| 4,618,423 A * | 10/1986 | Hodgkins | | B01D 35/14 210/314 |
| 5,730,766 A * | 3/1998 | Clements | | B01D 46/58 55/377 |
| 6,402,943 B1 * | 6/2002 | Bohlender | | F02M 37/30 219/505 |
| 6,716,349 B2 * | 4/2004 | Baracchi | | B01D 27/148 210/DIG. 5 |
| 6,939,464 B1 * | 9/2005 | Jiang | | B01D 29/21 210/450 |
| 7,332,009 B2 * | 2/2008 | Casey | | B01D 46/2414 55/330 |
| 7,906,022 B2 * | 3/2011 | Matsushita | | F02M 37/42 210/450 |
| 7,922,004 B2 * | 4/2011 | Matsushita | | F02M 37/42 210/451 |
| 8,181,620 B2 * | 5/2012 | Rolland | | F02M 35/10354 123/184.21 |
| 8,182,569 B2 * | 5/2012 | Casey | | B01D 46/58 55/486 |
| 8,394,164 B2 * | 3/2013 | Casey | | B01D 46/58 55/486 |
| 9,726,123 B2 * | 8/2017 | Madeira | | F02M 35/02483 |
| 10,233,882 B2 * | 3/2019 | Kern | | B01D 35/005 |
| 10,253,738 B2 * | 4/2019 | Da Costa | | B01D 36/008 |
| 10,302,050 B2 * | 5/2019 | Sorger | | F02M 35/02483 |
| 10,744,428 B2 * | 8/2020 | Wyhler | | B01D 35/18 |
| 10,837,414 B2 * | 11/2020 | Holzwarth | | B01D 46/2414 |
| 10,871,132 B2 * | 12/2020 | Eichinger | | D01F 6/92 |
| 11,130,083 B2 * | 9/2021 | Chretien | | F02M 37/32 |
| 2007/0084776 A1 * | 4/2007 | Sasur | | B01D 36/003 210/493.1 |
| 2007/0090037 A1 * | 4/2007 | Matsushita | | B01D 35/30 210/450 |
| 2007/0090043 A1 * | 4/2007 | Matsushita | | B01D 36/003 210/450 |
| 2009/0211959 A1 * | 8/2009 | Clint | | B01D 29/21 210/255 |
| 2009/0314727 A1 * | 12/2009 | Hacker | | F02M 37/44 210/232 |
| 2010/0031913 A1 * | 2/2010 | Rolland | | F02M 35/10039 123/184.21 |
| 2010/0206800 A1 | 8/2010 | Veit et al. | | |
| 2014/0174410 A1 * | 6/2014 | Myers | | F02M 37/0035 123/514 |
| 2014/0373495 A1 * | 12/2014 | Madeira | | F02M 35/02483 55/502 |
| 2015/0151233 A1 | 6/2015 | Johnson et al. | | |
| 2015/0308393 A1 * | 10/2015 | Boiger | | B01D 29/58 210/335 |
| 2016/0102638 A1 * | 4/2016 | Sorger | | F02M 35/02416 55/495 |
| 2016/0123282 A1 * | 5/2016 | Holzwarth | | B01D 46/2411 55/492 |
| 2016/0151723 A1 * | 6/2016 | Moreno Linares | | B01D 36/003 210/435 |
| 2016/0215740 A1 | 7/2016 | Chretien et al. | | |
| 2016/0222931 A1 * | 8/2016 | Jiang | | B01D 35/005 |
| 2016/0258397 A1 * | 9/2016 | Jiang | | F02M 37/24 |
| 2016/0263495 A1 * | 9/2016 | Wyhler | | B01D 29/15 |
| 2017/0067426 A1 * | 3/2017 | Da Costa | | B01D 36/003 |
| 2017/0067427 A1 * | 3/2017 | Kern | | B01D 35/18 |
| 2017/0144091 A1 * | 5/2017 | Wolhowe | | B01D 29/21 |
| 2018/0230952 A1 * | 8/2018 | Eichinger | | D01F 6/92 |
| 2019/0293036 A1 * | 9/2019 | Marcus | | B01D 35/005 |
| 2020/0095964 A1 * | 3/2020 | Moore | | B01D 29/56 |
| 2020/0261835 A1 * | 8/2020 | Girondi | | B01D 29/15 |
| 2020/0277920 A1 * | 9/2020 | Girondi | | B01D 29/56 |

FOREIGN PATENT DOCUMENTS

| | | | | |
|---|---|---|---|---|
| EP | 3320960 A1 * | 5/2018 | | B01D 29/016 |
| EP | 3320960 A1 | 5/2018 | | |
| EP | 3626325 A1 * | 3/2020 | | B01D 46/0012 |
| EP | 3320960 B1 * | 12/2020 | | B01D 29/016 |
| EP | 3141293 B1 * | 12/2021 | | B01D 17/045 |

* cited by examiner

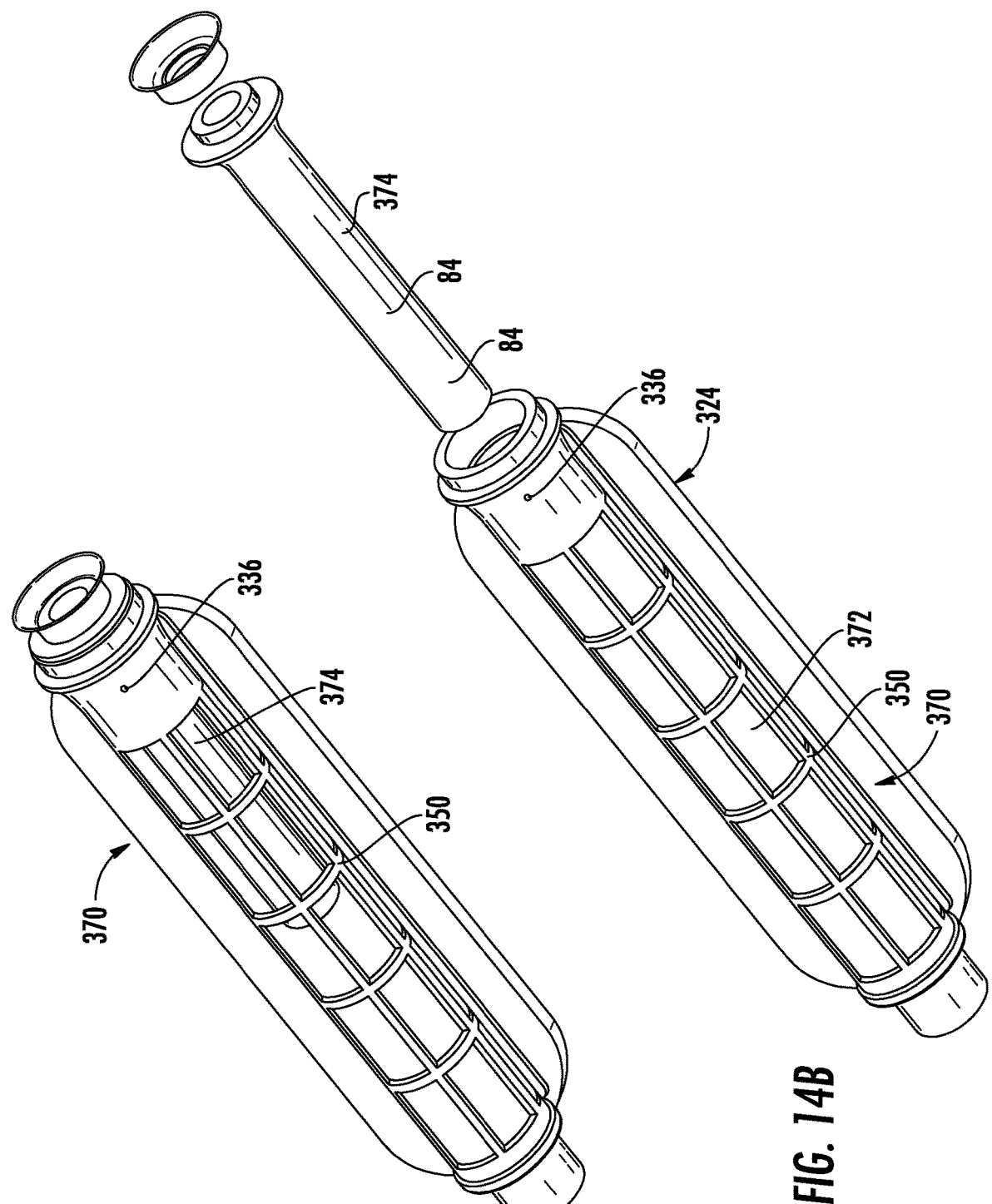

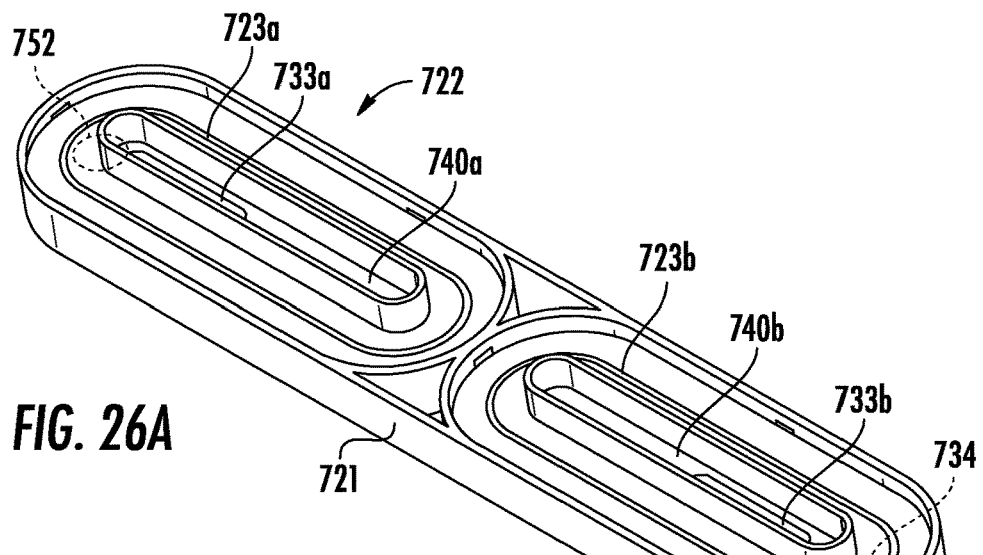
FIG. 26A
FIG. 26B
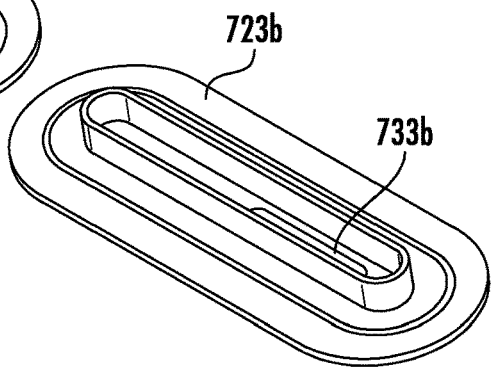
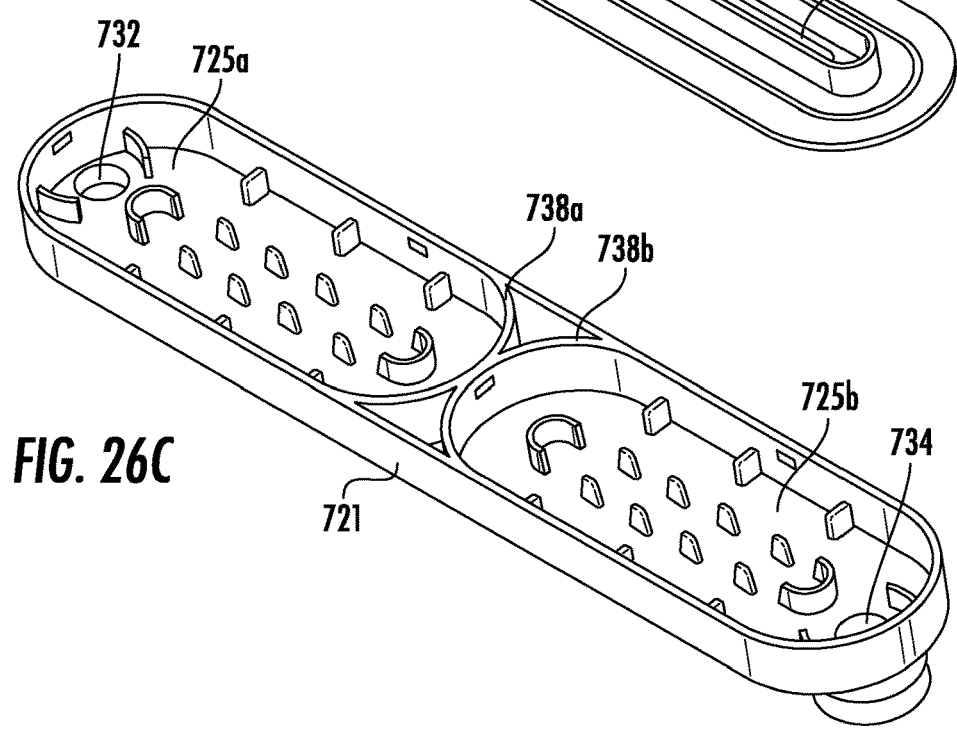
FIG. 26C

OBROUND FILTER ELEMENT

BACKGROUND

The present disclosure relates to filters, and more particularly, to a filter element for use in a fuel supply system for a motor vehicle.

Significant quantities of contaminants such as particulates and dissolved or emulsified water may be found in fuel. To remove contaminants and prevent damage to sensitive engine components, fuel supply systems may include one or more filter assemblies configured to remove particulates and water from the fuel supply. Filter assemblies include one or more replaceable filter elements, which may take the form of a filter cartridge or a filter element enclosed in a filtration chamber. The filtration chamber includes a cover or access panel that can be opened to permit replacement of the filter element at defined service intervals.

A filter element, whether it is part of a filter cartridge or a replacement part for use in a re-usable filter housing, includes filter media secured to structural components that support seals and mate with the surrounding structure to direct fuel through the filter media. Many fuel filter assemblies employ a cylindrical arrangement of pleated, non-woven filter media situated in a cylindrical filtration chamber, although the filter media and filtration chamber may assume any shape. As is known in the art, water entrained in diesel fuel coalesces from the fuel as it passes through the filter media, and diesel fuel filtration systems typically include means for separating this water from the fuel before it is delivered to sensitive engine systems. A water separator may be concentric with a ring of pleated filter media, either radially within the ring of filter media or may be axially below the ring of filter media. A water separator may also be a separate unit arranged before or after a particulate filter. Filter elements may include non-woven media specifically configured to coalesce water into larger droplets, which can then be separated from the fuel flow.

A circular cover may be secured to the filtration chamber by a threaded, bayonet type, or other connection to define a sealed enclosure. A round filter element or filter cartridge can be rotated relative to a stationary filter head or re-usable filter housing to connect and disconnect a filter cartridge or housing cover during replacement of a filter cartridge. Though circular filter housings with cylindrical filter elements have been functional and standard for many years, cylindrical filter element housings have become increasingly problematic. In some cases, decreasing space for filtration systems within an engine compartment is prompting alternative designs for filtration assemblies. Further, limited space between the filter media and the water separator does not provide sufficient diffusion of water prior to separation.

There is a need in the art for a filter element with an optimized design that is capable of utilizing less space within an engine compartment.

SUMMARY OF THE INVENTION

In the following embodiments described below, an obround filter element (hereafter, "filter element") is disclosed. In the disclosed embodiments, an obround ring of filter media, along with strategic positioning of an inlet, an outlet, a water separator, static electricity discharge, and an air management system, produces a filter element that is obround and/or oblong in shape, rather than cylindrical, to make more efficient use of space on a vehicle occupied by the fuel filter assembly while also providing sufficient filter media surface area and distance between the filter media and the water separator for effective removal of coalesced water within a fuel supply system.

In a first embodiment of the filter element, the filter element is configured for use within a narrow, rectangular housing of a filter assembly. The filter element includes an obround ring of pleated filter media which extends axially between an upper endcap and a lower endcap for filtering particulates and coalescing water from fuel. The upper endcap of the filter element defines an inlet for receiving unfiltered (dirty/wet) fuel, which flows into a central region of the filter element and radially outward through the ring of pleated filter media. Depending upon the configuration of the upper endcap, one or more pleats of the filter media is opened and/or flattened to accommodate the inlet defined by the upper endcap. A clean wet fuel region is defined outside the filter element, and within the filter enclosure. After flowing through the inlet and the filter media, fuel with particulates removed, but still including water fills the clean wet fuel region. A water separator is disposed external to the ring of filter media, and defines a clean dry fuel region in communication with the outlet defined by the upper endcap. The water separator is a hydrophobic mesh or media that separates water from the fuel leaving the filter assembly, with separated water falling to the bottom of the filter enclosure.

The obround ring of filter media may be oriented vertically or horizontally within the filter enclosure, with the endcaps configured accordingly. The endcaps may be connected to each other by grid-like support structure to support the ring of filter media against the flow of fuel. The water separator may be a hydrophobic plastic mesh. The water separator may include an outlet conduit with openings to manage air leaving the filter enclosure after replacement of the filter element, or bubbles of gas that may become trapped in the filter enclosure during use. One objective of the air management structure is to allow air to leave the filter enclosure after replacement of a filter element. Another objective is to break air or gas into small bubbles and prevent large air bubbles from leaving the filter enclosure all at once.

The endcaps may define a manifold or flow chamber to distribute fuel into the central (dirty) region of the ring of filter media. The endcap may be a single molded part or may be composed of two or more molded parts that together direct incoming fuel into the central region of the filter element.

In a third embodiment of the filter element, the filter element includes vertically disposed influent and effluent endcaps. The filter media of the third embodiment is oriented 90° to accommodate the vertical influent and effluent endcaps.

BRIEF DESCRIPTION OF THE DRAWINGS

Aspects of disclosed embodiments will be described in reference to the drawings, where like numerals reflect like elements:

FIG. 14A is a side perspective view of the vertical effluent endcap and a water separator of the filter element of FIG. 11;

FIG. 14B is a side perspective exploded view of the vertical effluent endcap and the water separator of the filter element of FIG. 11;

FIG. 26A is a bottom perspective view of a binary modular upper endcap of the filter element of FIG. 24;

FIG. 26B is a bottom perspective view of an influent and effluent endcap insert of the binary modular upper endcap of FIG. 26A;

FIG. 26C is a bottom perspective view of an influent and effluent upper endcap of the binary modular upper endcap of FIG. 26A;

DETAILED DESCRIPTION

Embodiments of filter elements incorporating obround arrangements of filter media according to aspects of the disclosure will now be described with reference to the Figures, wherein like numerals represent like parts. Various materials, methods of construction and methods of fastening will be discussed in the context of the disclosed embodiments. Those skilled in the art will recognize known substitutes for the materials, construction methods, and fastening methods, all of which are contemplated as compatible with the disclosed embodiments and are intended to be encompassed by the appended claims.

Figure 1:
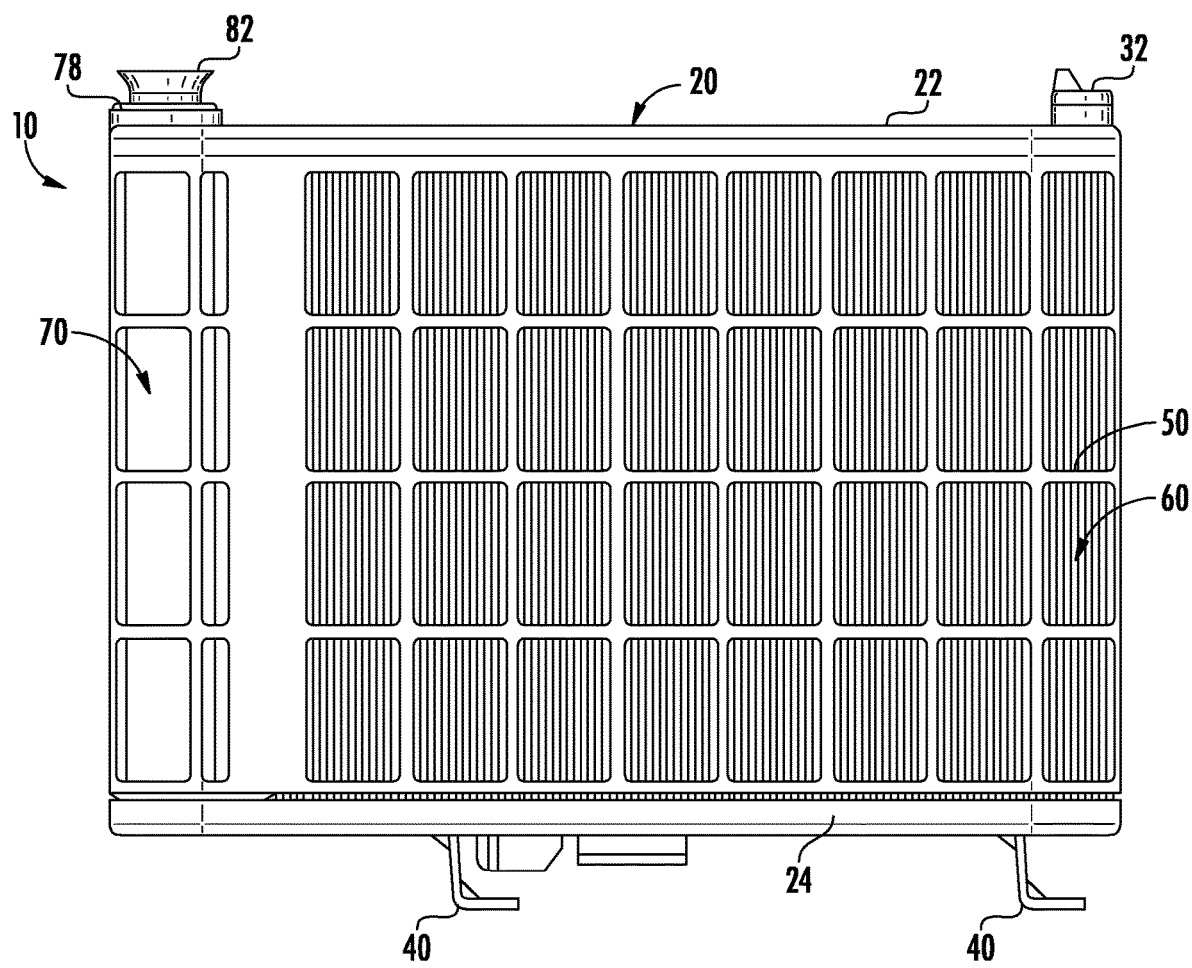
FIG. 1 is a front view of a first embodiment of an obround filter element (hereafter, "filter element") according to aspects of the disclosure.
Figure 2:
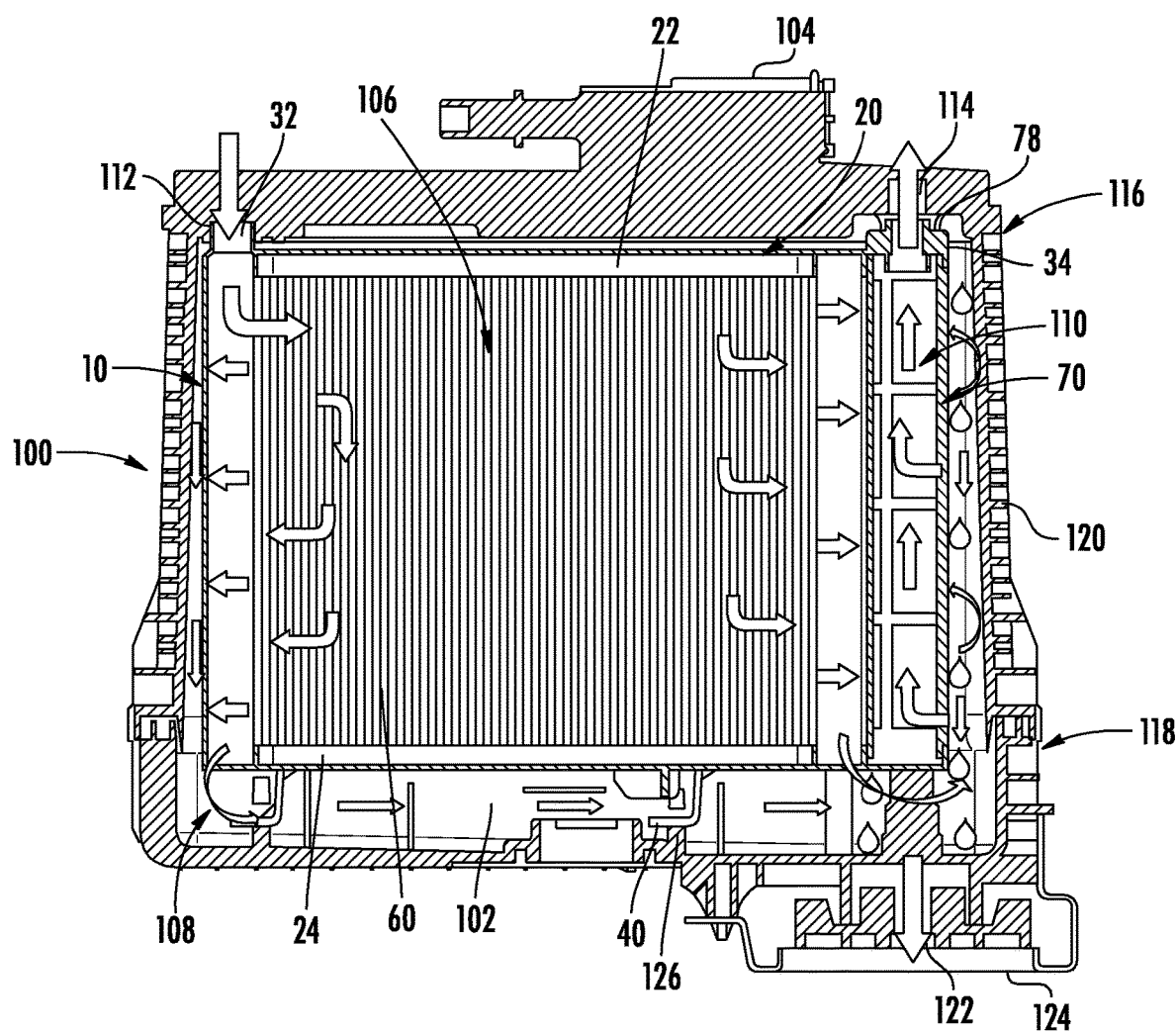
FIG. 2 is a rear cross-sectional view of the filter element of FIG. 1 disposed within a housing and showing the direction of fluid flow.

A first disclosed embodiment of a filter element will generally be referred to by the reference numeral 10. As shown in FIGS. 1 and 2, the filter element 10 is for use in a filtration assembly for filtering fuel (fluid) in a fuel supply system of an engine. It will be apparent to those of ordinary skill in the art that the filter element 10 may be used to filter fluids other than fuel. The filter element 10 is structurally supported by a frame 20 which includes an upper endcap 22, a peripheral wrapper (support grid) 50, and a lower endcap 24. An obround ring of filter media 60 extends between the upper and lower endcaps 22, 24 and is supported in an outward direction by the peripheral wrapper 50. The ring of filter media 60 is illustrated as a ring of pleated, non-woven filter media, but other forms of filter media are compatible with the disclosed filter assembly.

According to aspects of the disclosure, a water separator 70 is integrated with the peripheral wrapper 50 as a single component, although in other embodiments, the water separator 70 can be structurally independent of the peripheral wrapper 50. As shown in FIG. 2, the filter element 10 may be received in a filtration chamber 102 defined by a housing 100 which is in communication with a manifold 104 (partially shown). When the filter element 10 is received in the filtration chamber 102, the filter element 10 divides the filtration chamber 102 into three regions—a dirty fuel region 106 within the ring of filter media 60 and bounded by the filter media 60 and the upper and lower endcaps 22, 24, a clean wet fuel region 108 outside of the ring of filter media 60 defined between the filter media 60 and the housing 100, and a clean dry fuel region 110 defined within the water separator 70. The filter element 10 includes an inlet 32 for fuel to be filtered and mates with a fuel inlet 112 on the filter housing 100. A clean fuel outlet 34 on the filter element 10 mates with and seals to a clean fuel outlet 114 on the filter housing 100.

As illustrated in FIG. 2, in the above arrangement, fuel to be filtered passes through the inlet 112 of the housing 100 and the inlet 32 on the upper endcap 22. Fuel fills the dirty fuel region 106 within the oblong ring of filter media 60, and between the upper endcap 22 and the lower endcap 24. During operation of the filter assembly, fuel flows from dirty fuel region 106 radially outward through the filter media 60, coalescing water and separating particulates from the fuel. Clean fuel and coalesced water fills the clean wet fuel region 108 defined between the filter element 10 and the housing 100. The clean wet fuel flows radially inward through the water separator 70, separating water from the fuel. The separated water settles to the bottom of the housing 100. Clean dry fuel flows through the outlet 34 of the filter element 10 and the outlet 114 of the housing 100 to downstream engine components.

Referring to FIG. 2, the housing 100 includes an upper (first) fixed housing portion 116 and a lower (second) movable housing portion (door) 118. The upper housing portion 116 is secured to the vehicle, while the movable lower housing portion 118 is engaged in sealed relationship to the upper housing portion 116 by a plurality of fasteners (not shown). The upper and lower housing portions 116, 118 define a filtration chamber 102 surrounding the filter element 10. In one embodiment of the filter assembly, the housing 100 includes threaded nuts (not shown) integrally molded with the upper housing portion 116, and bolts are used to secure the housing 100 to a vehicle and to secure the housing lower portion 118 to the housing upper (fixed) portion 116. However, alternative fastening techniques, including spring clips, capable of providing the force needed to maintain a sealed relationship between the upper and lower housing portions 116, 118 are within the scope of the disclosed filter assembly. Referring to FIGS. 1 and 2, one or more hooks 40 extend away from the bottom of the lower endcap 24 for engaging one or more catches 126 extending upwardly from the lower housing portion 118. Full engagement between the hooks 40 and the catches 126 locates the filter element 10 within the housing 100. During service, the lower housing portion 118 is detached by a user from the upper housing portion 116. The user pulls the lower housing portion 118 downward and the filter element 10, which is still attached to the lower housing portion 118, is removed simultaneously. The spent filter element is disengaged from the lower housing portion 118 and exchanged for a replacement filter element 10. The replacement filter element is axially inserted upwardly into the upper housing portion 116 and the lower housing portion 118 is re-connected to the upper housing portion 116. The filter element 10 is held within the housing 100 with the filter element inlet 32 and outlet 34 engaged with the inlet 112 and outlet 114 of the housing 100.

A dirty fuel inlet 112 and a clean fuel outlet 114 are each defined by the upper housing portion 116 and are in communication with an upstream supply of fuel such as a fuel tank and downstream engine components such as a fuel injection pump, respectively. The disclosed housing 100 is constructed of fiber reinforced plastic and includes an outward-facing pattern of reinforcing ribs 120 configured to provide structural integrity to the housing 100. The ribs 120 form a web-like pattern that prevents the housing 100 from collapsing when a fuel pump (not shown) creates a negative pressure inside the housing 100 when extracting fuel from the fuel tank. Alternatively, the fuel pump may also be configured to push fuel into the housing 100 creating a positive pressure inside the assembly.

A water outlet 122 is disposed at the bottom of the filtration chamber, passing through the lower housing portion 118. A valve cap 124 closes the water outlet 122 for selective release of water separated from the fuel. The valve cap 124 drains fuel and water from the assembly during service when disengaged or released from the water outlet 122. In the disclosed embodiment, a conductive material may be incorporated into any one of the filter media 60, the upper and lower endcaps 22, 24, the peripheral wrapper 50 and a center tube (if present) so that static electricity can be removed via a ground connected to the lower endcap 24.

Figure 3:
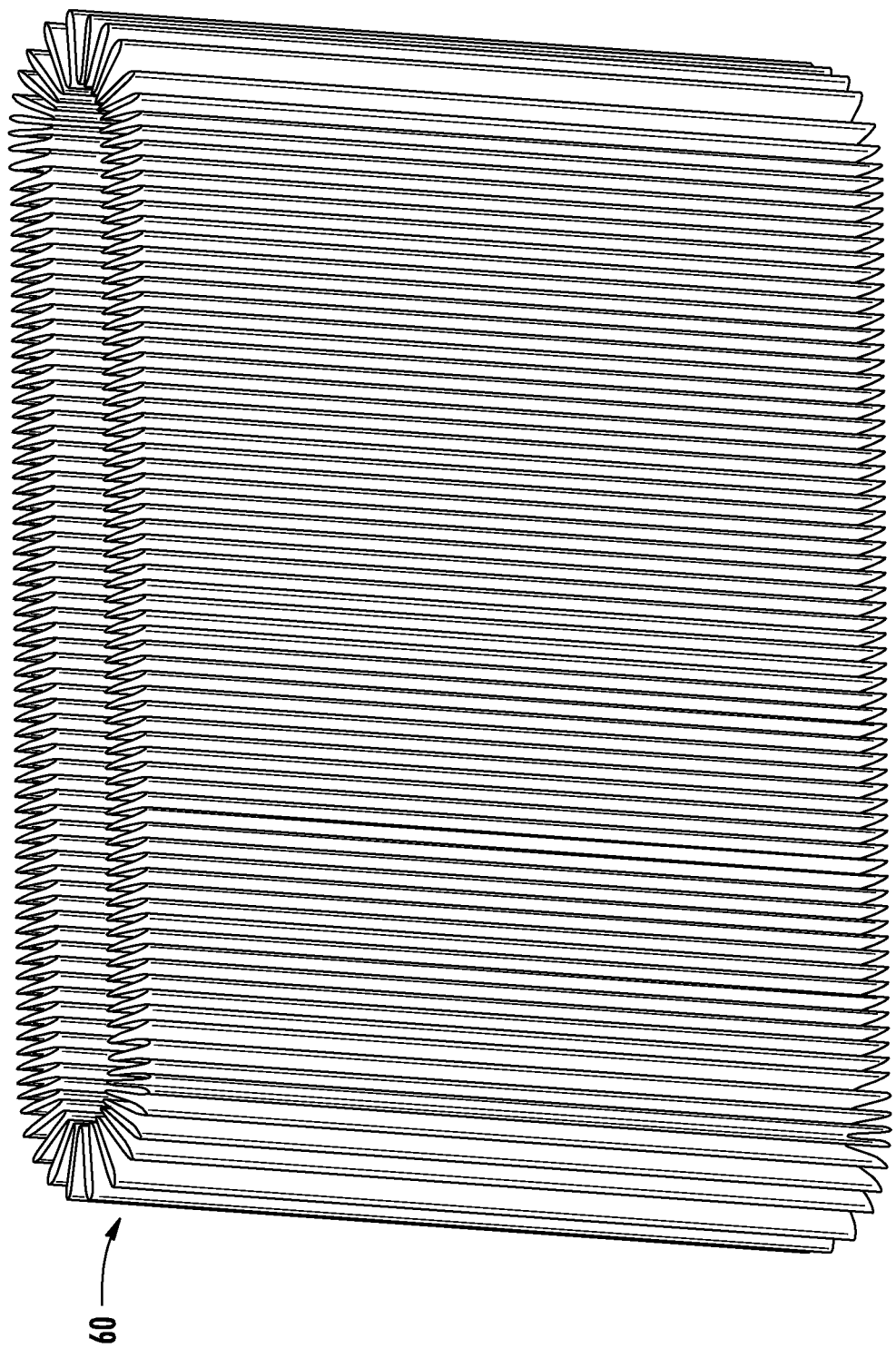
FIG. 3 is a front view of an obround ring of filter media of the filter element of FIG. 1.

The frame 20 of the filter element 10 includes an upper (first) obround endcap 22 and a lower (second) obround endcap 24. As shown in FIGS. 2 and 3, an obround ring of filter media 60 extends axially between and is attached to the upper and lower endcaps 22, 24 in a fluid tight relationship. In the disclosed embodiments, the term "filter media" applies to fibrous and/or permeable structures and materials intended to remove particulates from a fluid flow as well as structures intended to separate water from a fluid flow, such as a hydrophobic screen or surface treatment. In filter elements where fuel flows radially outward through filter media from a region surrounded by filter media, water entrained in the fuel is allowed to pass radially outward through the filter media 60, and the water naturally coalesces into larger droplets. Coalesced water is then separated from the flow of fuel using a hydrophobic mesh or a surface treatment on a downstream non-woven filter media, as is known in the art. Separated water is denser than fuel, and sinks to the bottom of the filtration chamber, accumulating near the water outlet 122.

Figure 4:
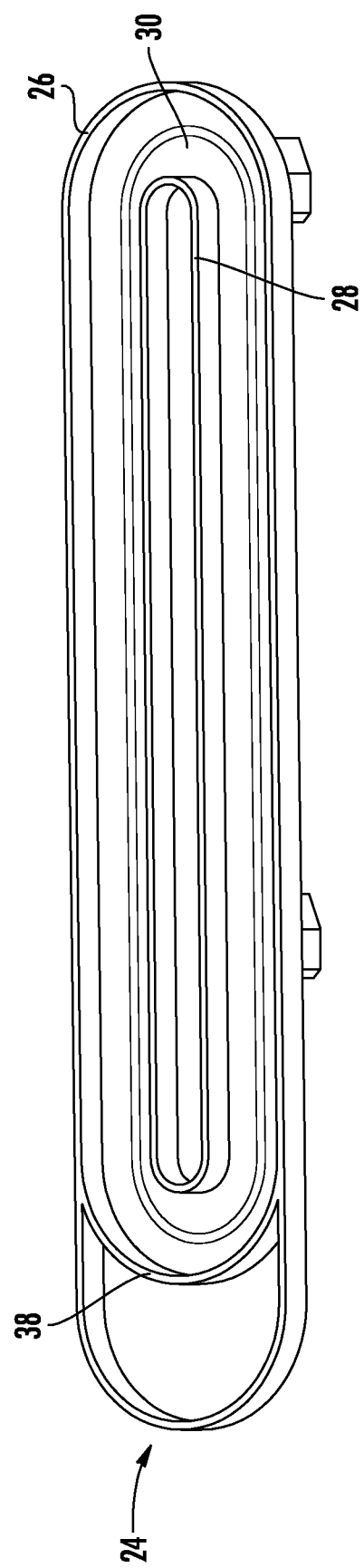
FIG. 4 is a top perspective view of a lower endcap of the filter element of FIG. 1.
Figure 5:
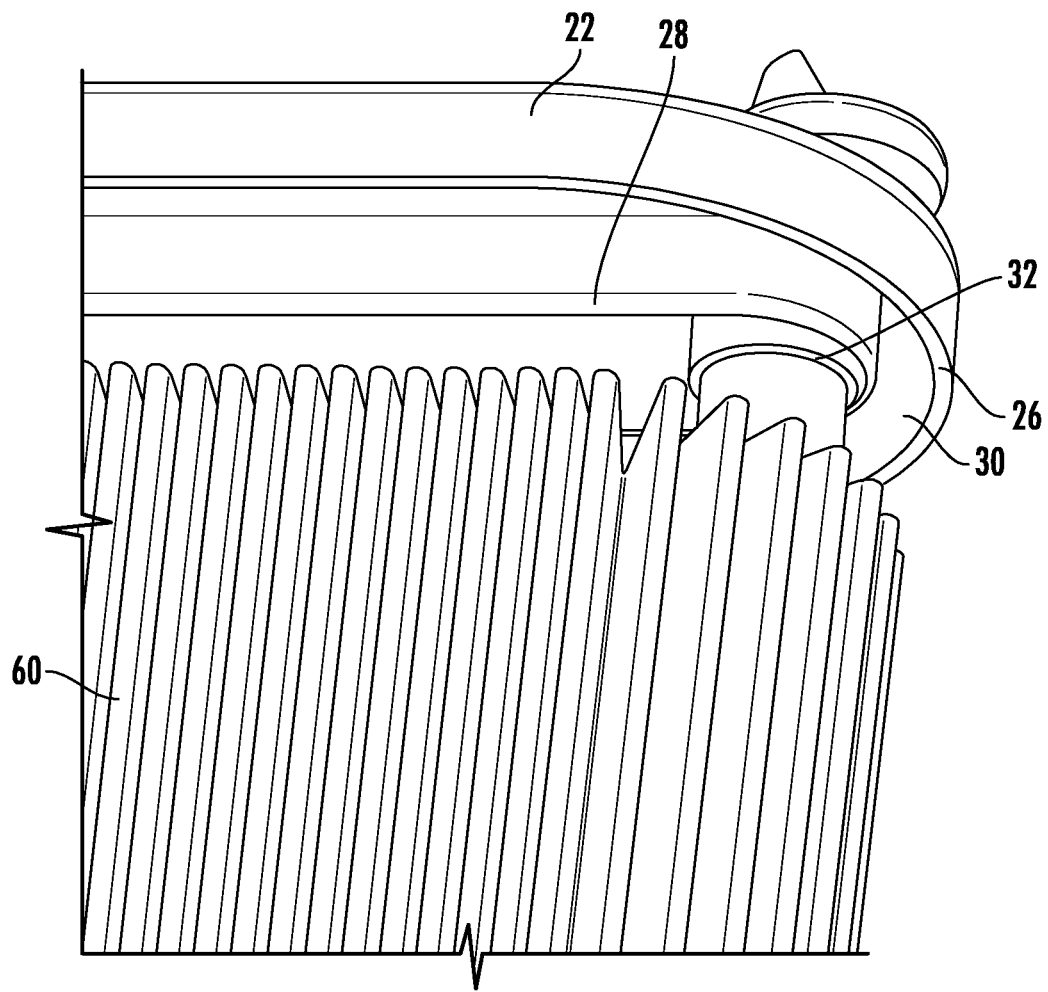
FIG. 5 is a partial bottom perspective view of an upper endcap and the filter media of the filter element of FIG. 1.
Figure 6:
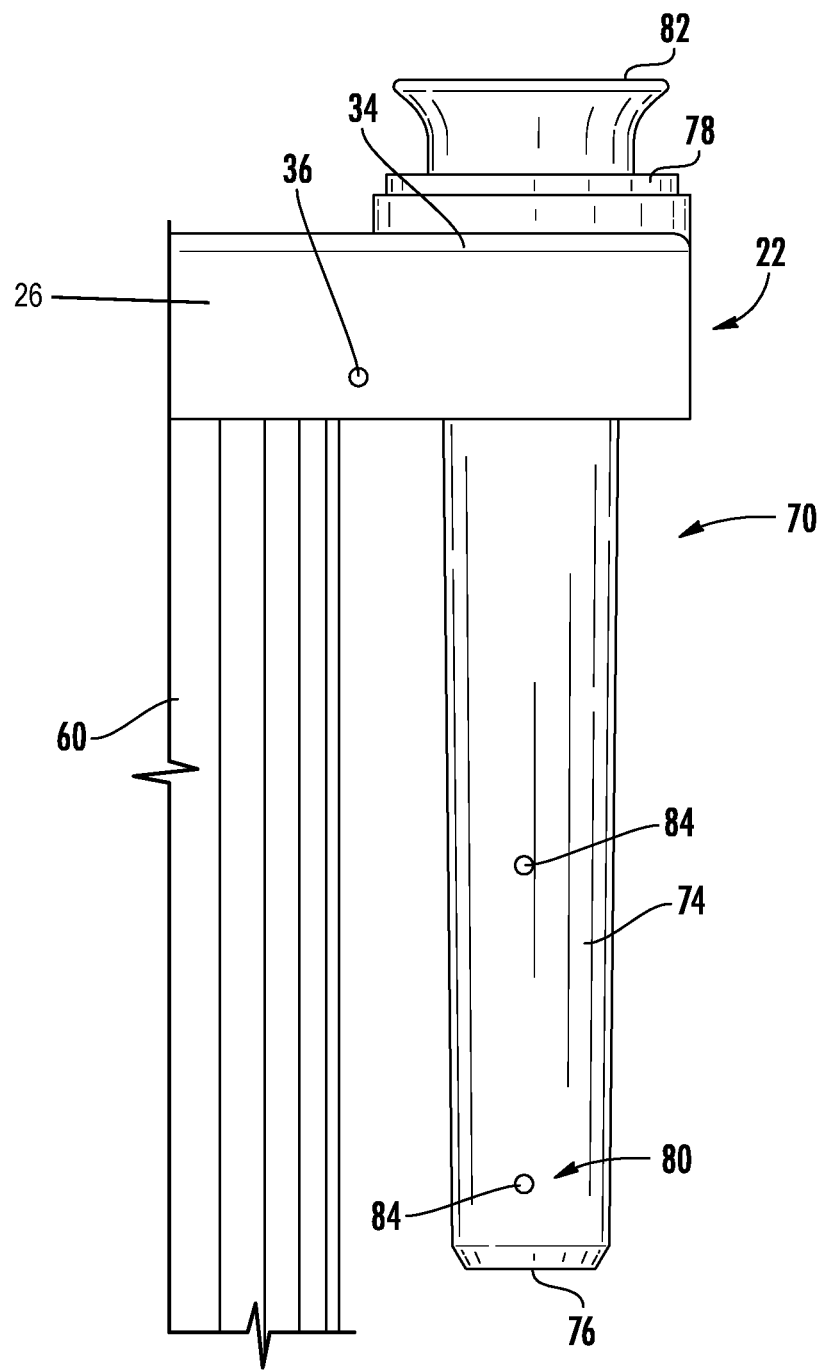
FIG. 6 is a partial rear view of the upper endcap, filter media and an outlet tube of the filter element of FIG. 1.
Figure 7:
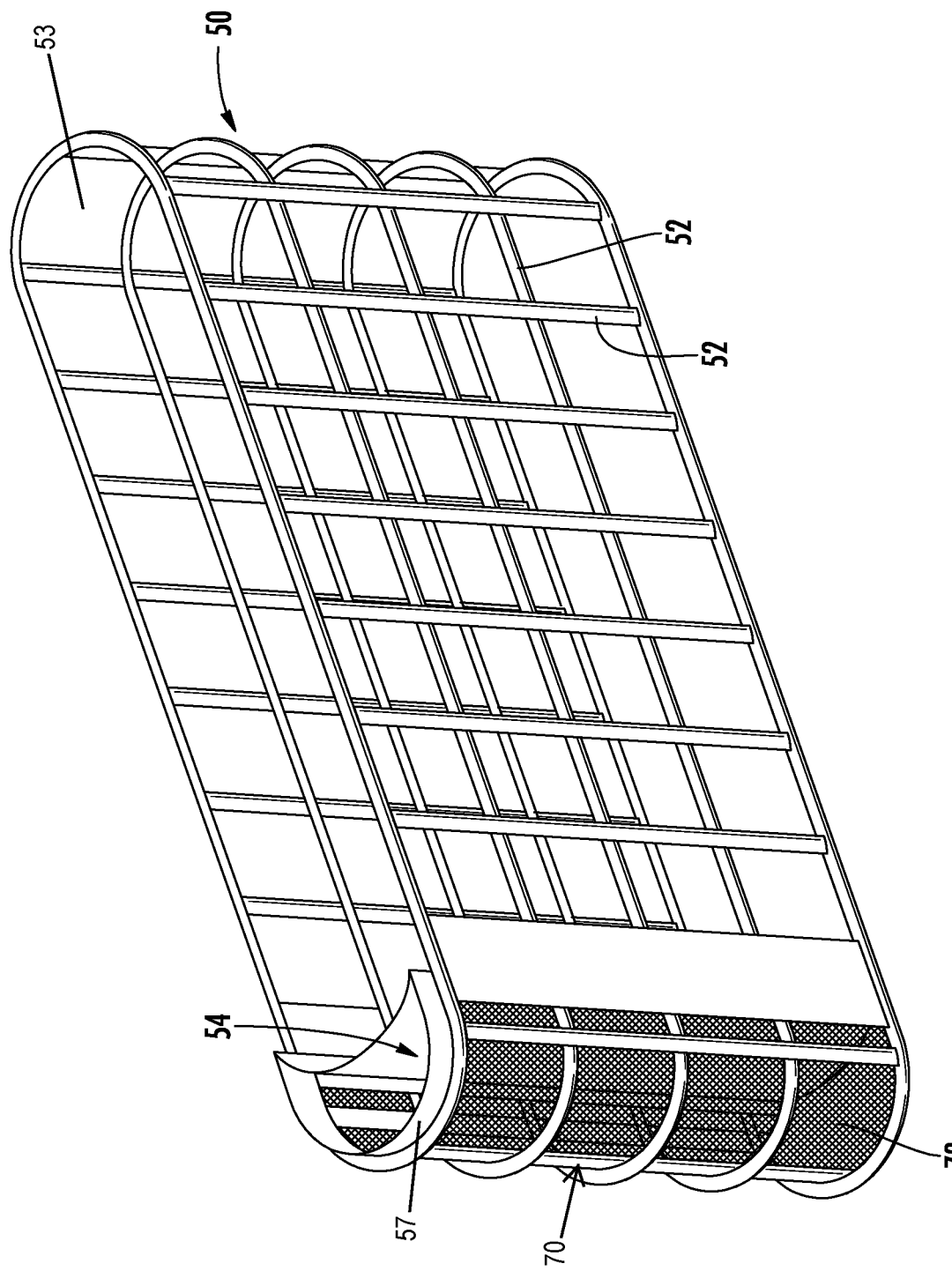
FIG. 7 is a front perspective view of a peripheral wrapper and part of a water separator of the filter element of FIG. 1.

As shown in FIGS. 4 and 5 the upper and lower endcaps 22, 24 are each obround in shape and include a peripheral rim 26 and an inner rim 28 which together define a track 30 for receiving an axial end of the ring of filter media 60. The axial ends of the ring of filter media 60 can be secured to the upper and lower endcaps 22, 24 by adhesive, heat staking, or other methods known in the art to establish a sealed relationship with the endcaps 22, 24. FIG. 7 illustrates the peripheral wrapper 50, which is a molded plastic grid of ribs 52 defining an obround central region 53 that receives the obround ring of filter media 60. According to aspects of the disclosure, the peripheral wrapper 50 is integrally molded with a water separator 70. The water separator 70 is separated from the central region 53 by an arcuate wall 54 to isolate the clean dry fuel region 110 inside the water separator 70 from the clean wet fuel region 108. In the region of the peripheral wrapper corresponding to the water separator 70, the molded ribs 52 are overmolded with a hydrophobic mesh 72, which functions to separate coalesced water from a flow of fuel entering the water separator 70. The arcuate wall 54 and water separator 70 include a rim 57 that projects axially to overlap with the outer rim 26 and lip 38 defining the track 30 in the lower and upper endcaps 24, 22. The axial ends of the obround ring of filter media 60 and the rim 57 are embedded in adhesive to seal the water separator 70 and the ring of filter media 60 to the upper and lower endcaps 22, 24. Fuel must pass radially outward through the filter media 60 and then pass radially inwardly through the hydrophobic mesh 72 to enter the interior of the water separator 70. The clean dry fuel region 110 within the water separator 70 communicates with the outlet 34 of the filter element 10. As shown in FIG. 6, the upper endcap 22 may include an axially extending outlet tube 74.

Each inner rim 28 defines an obround shape aligned within the obround central region 53 within the peripheral wrapper 50. This arrangement puts the fuel inlet 32 of the upper endcap 22 in communication with the dirty fuel region 106 within the ring of filter media 60. A lip 38 (shown in FIG. 4) extends inwardly from the peripheral rim 26 and traverses the upper and lower endcaps 22, 24 to define an outer margin of the track 30 adjacent the water separator 70. In the disclosed embodiment, the lip 38 is arcuate in shape, following the obround shape of the ring of filter media 60 and the central region 53 of the peripheral wrapper 50. The arcuate lip 38 is positioned to axially overlap with the rim 57 of the water separator 70 to separate clean wet fuel that has passed through the filter media 60 from clean dry fuel that has flowed into the water separator 70. As illustrated in FIG. 5, one or more pleats of the filter media 60 may be opened and/or flattened to accommodate the fuel inlet 32 of the upper endcap 22, so that the fuel inlet 32 is in communication with the dirty fuel region 106.

Air or gases can be entrained in fuel and accumulate at the top of the interior of the filtration chamber 102 during operation of the filter assembly. During exchange of a filter element 10, the filtration chamber 102 defined within the housing 100 is emptied of fuel and is filled with air after installation of a new filter element. Air must be removed from within the housing 100 to allow fuel to fill the housing, however during operation of the fuel filter assembly it is preferred that large bubbles of air not be released at the outlet 114. In other words, it is preferred that air removal from the filter housing 100 be managed so as not to disrupt operation of downstream engine components. As shown in FIG. 6, the peripheral rim 26 of the upper endcap 22 may define an air bleed hole 36 adjacent the clean fuel outlet 34 of the upper endcap 22. As fuel fills the dirty fuel region 106 within the ring of filter media 60, air is pushed out of the air bleed hole 36. With reference to FIG. 6, the outlet 34 of the filter element may an outlet tube 74 extending axially into the water separator 70. The outlet tube 74 is ultrasonically welded (or otherwise attached) to the outlet 34 defined by the upper endcap 22. The outlet tube 74 connects the interior of the water separator 70 with the clean fuel outlet 114 of the housing 100 and includes a clean dry fuel inlet 76, a clean dry fuel outlet 78 and an air management system 80. The outlet tube 74 or upper endcap 22 are provided with a flared circular seal 82 projecting axially above the upper endcap 22 to seal against the outlet 114 of the housing 100. The air management system 80 may include two axially spaced air bleed holes 84 defined by the outlet tube 74. As fuel fills the clean fuel region 108 of the housing 100 and flows into the water separator 70, air passes out of the water separator 70 through the clean dry fuel inlet 76 until fuel reaches the bottom of the outlet tube 74. After fuel has filled the housing 100 above the level of the bottom of the outlet tube 74, air passes through the air bleed holes 84 in small bubbles, managing the flow of air out of the filter assembly. As the fuel level rises within the housing 100, the air bleed holes 36, and 84 cooperate to allow air to flow out of the interior of the filter element 10 and housing 100.

Embodiments described hereafter share similar overall structures and relationships with the first embodiment of the filter element 10 and will be described with respect to features that are different from the first embodiment of the filter element 10 illustrated in FIGS. 1-7. Additionally, features that are the same or substantially similar between all embodiments may be referred to by the same or similar names and represented by like numerals. The external appearance of a second embodiment is identical to the first embodiment shown in FIG. 1. All disclosed filter elements are configured to be received in the filter housing 100 and mate with the inlet 112 and outlet 114.

Figure 8:
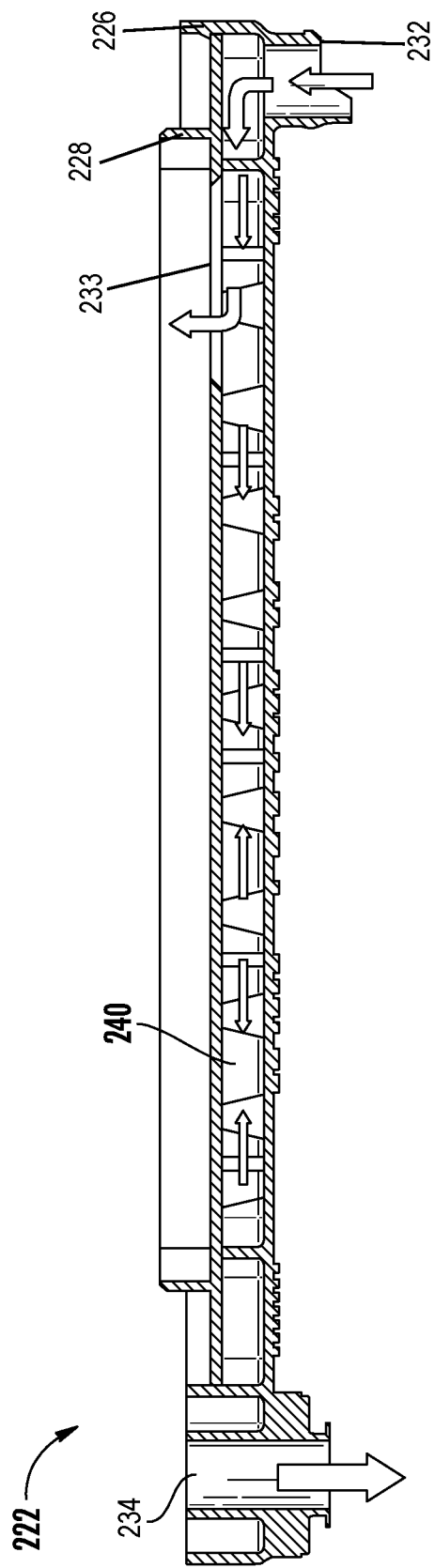
FIG. 8 is a rear view of a modular upper endcap of a second embodiment of the filter element according to aspects of the disclosure.
Figure 9A:
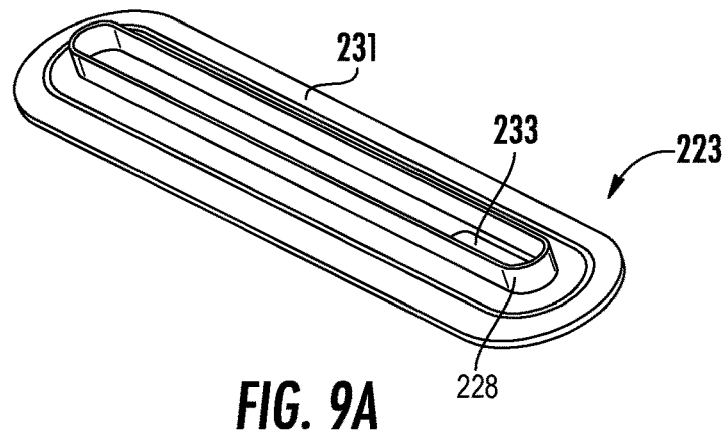
FIG. 9A is a bottom perspective view of an upper endcap insert for use with the modular upper endcap of FIG. 8.
Figure 9B:
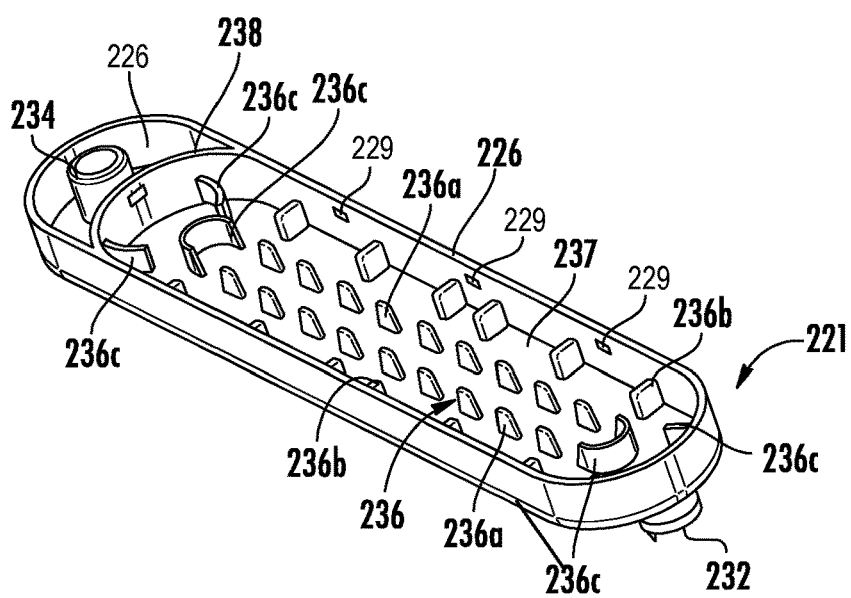
FIG. 9B is a bottom perspective view of an upper endcap of the modular upper endcap of FIG. 8.
Figure 9C:
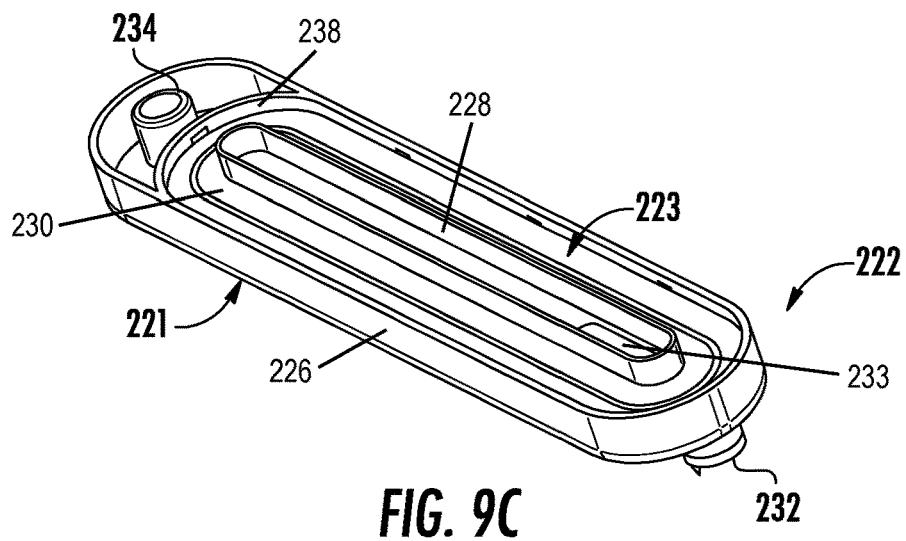
FIG. 9C is a bottom perspective view of the modular upper endcap of FIG. 8.
Figure 9D:
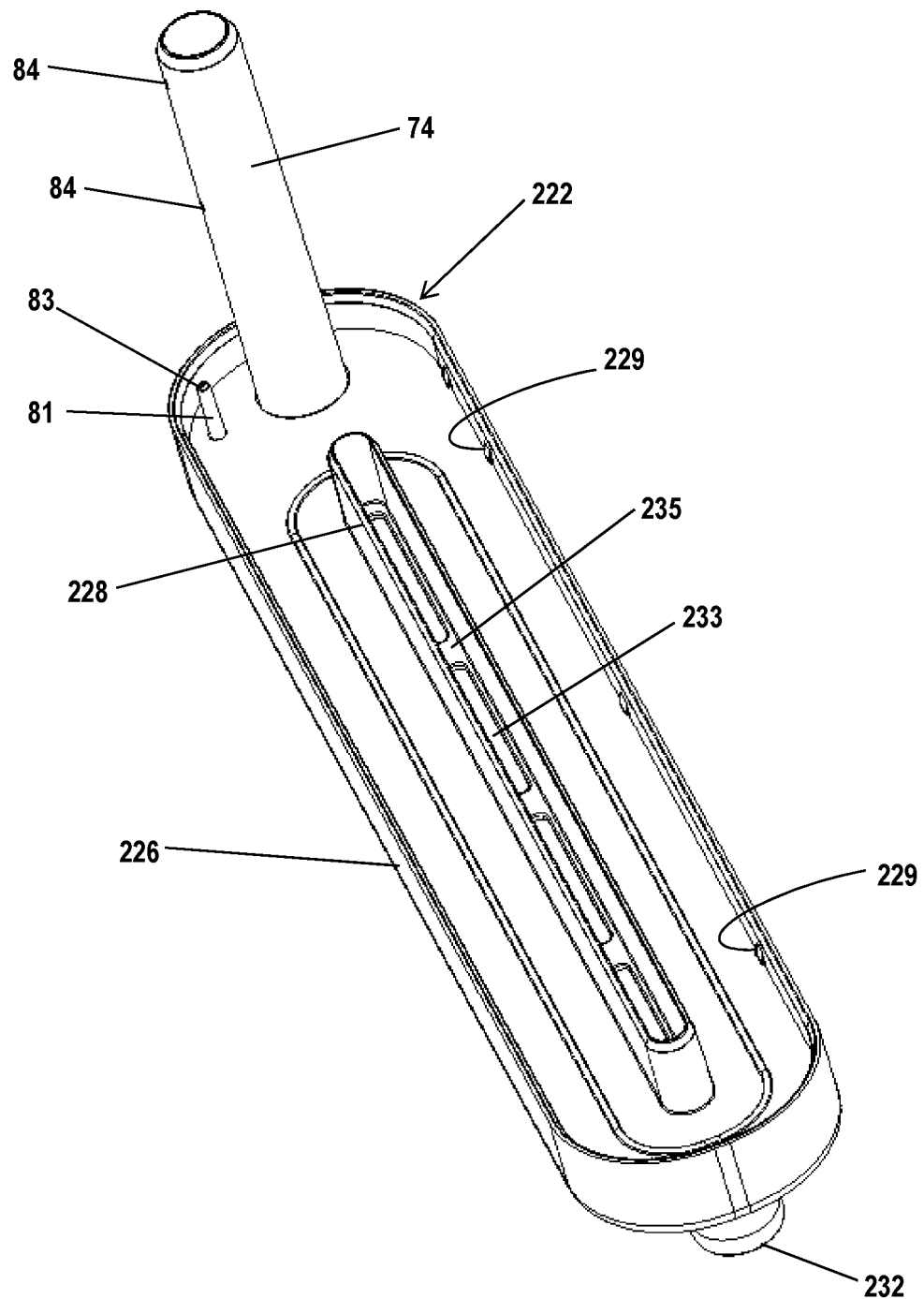
FIG. 9D is a bottom perspective view of an alternative modular upper endcap assembly compatible with a second embodiment of a filter element according to aspects of the disclosure.
Figure 9E:
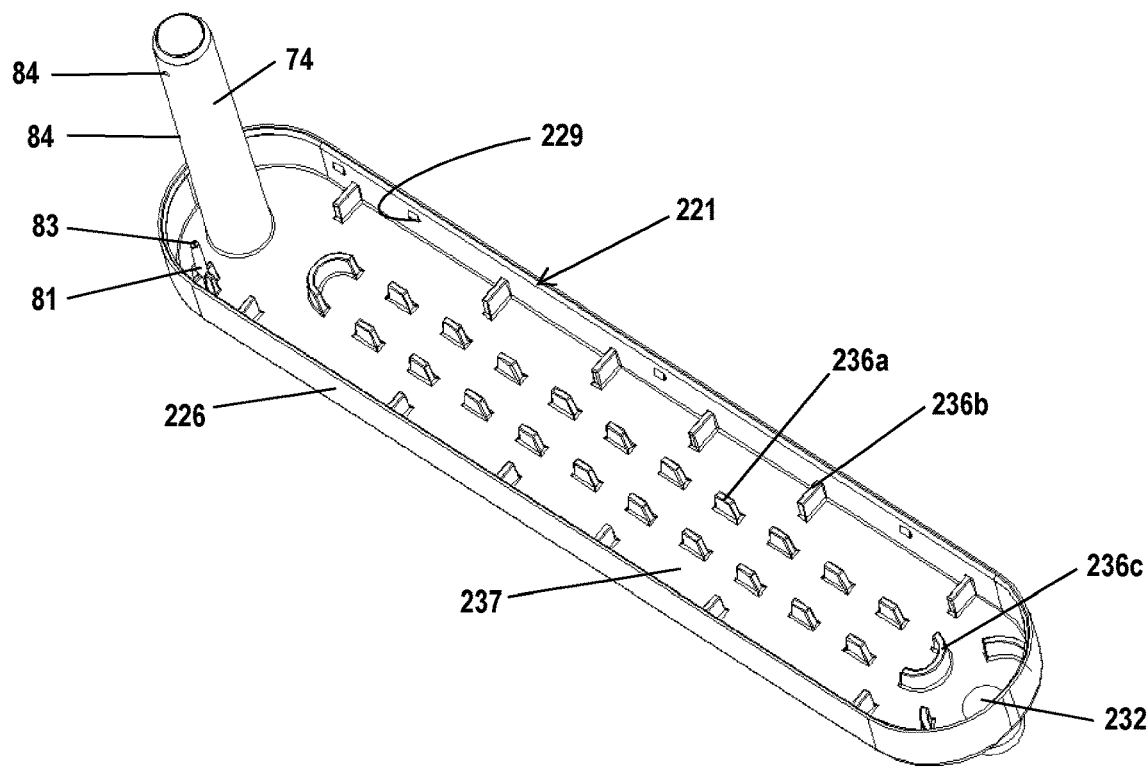
FIG. 9E is a bottom perspective view of an upper endcap of the modular upper endcap assembly of FIG. 9D.
Figure 9F:
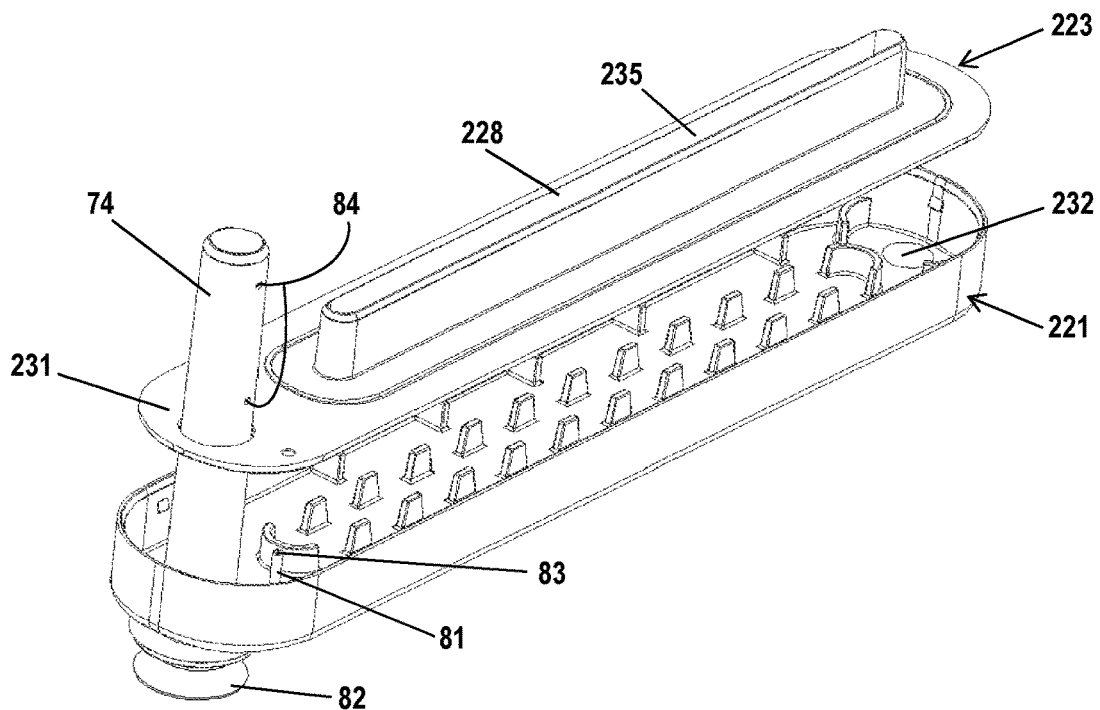
FIG. 9F is a bottom perspective view of the upper endcap of FIG. 9E and an upper endcap insert that together form the modular upper endcap assembly of FIG. 9D.
Figure 10:
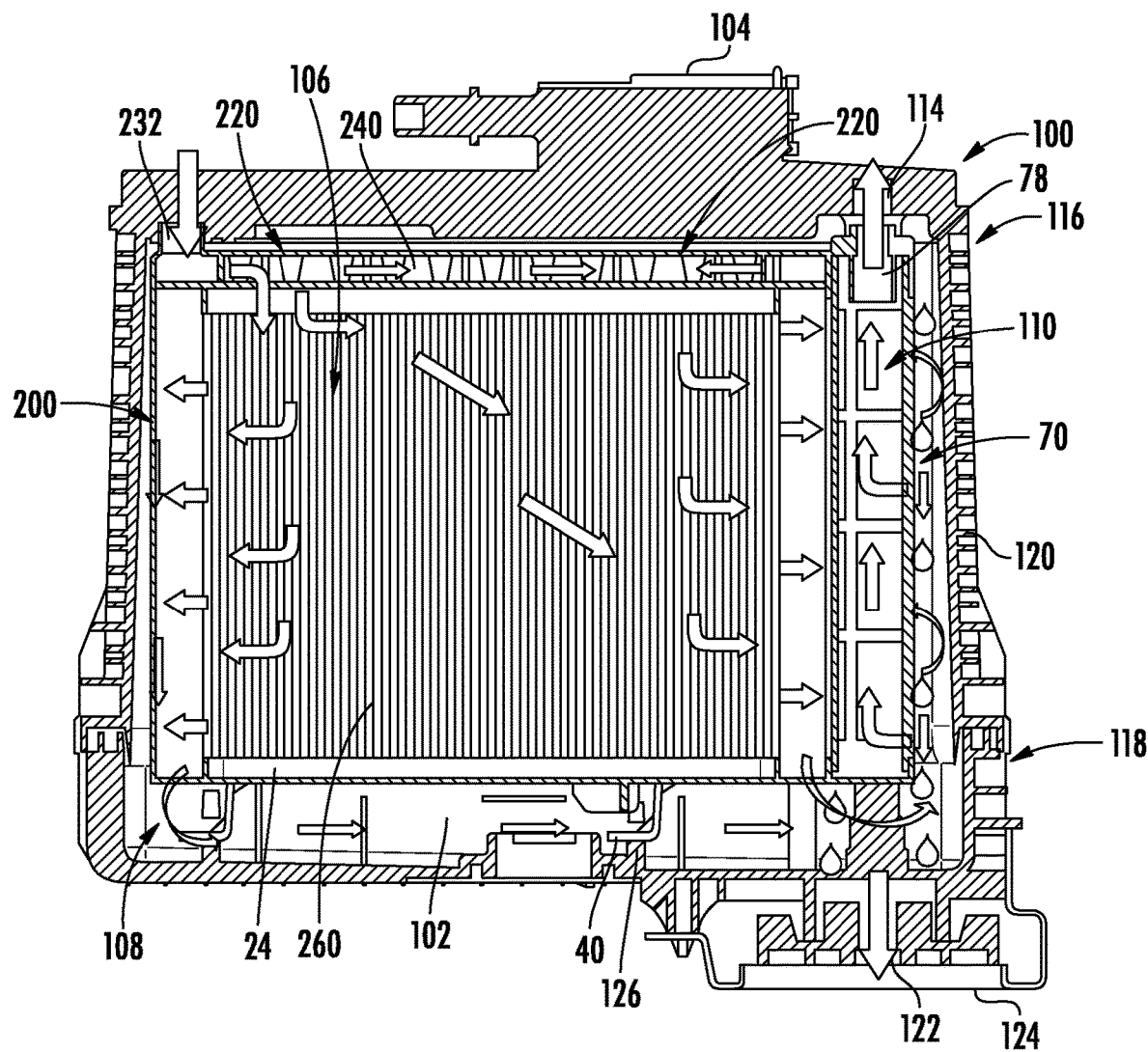
FIG. 10 is a rear view of the filter element incorporating the upper endcap of FIG. 8 disposed within a housing and showing the direction of fluid flow.
Figure 11:
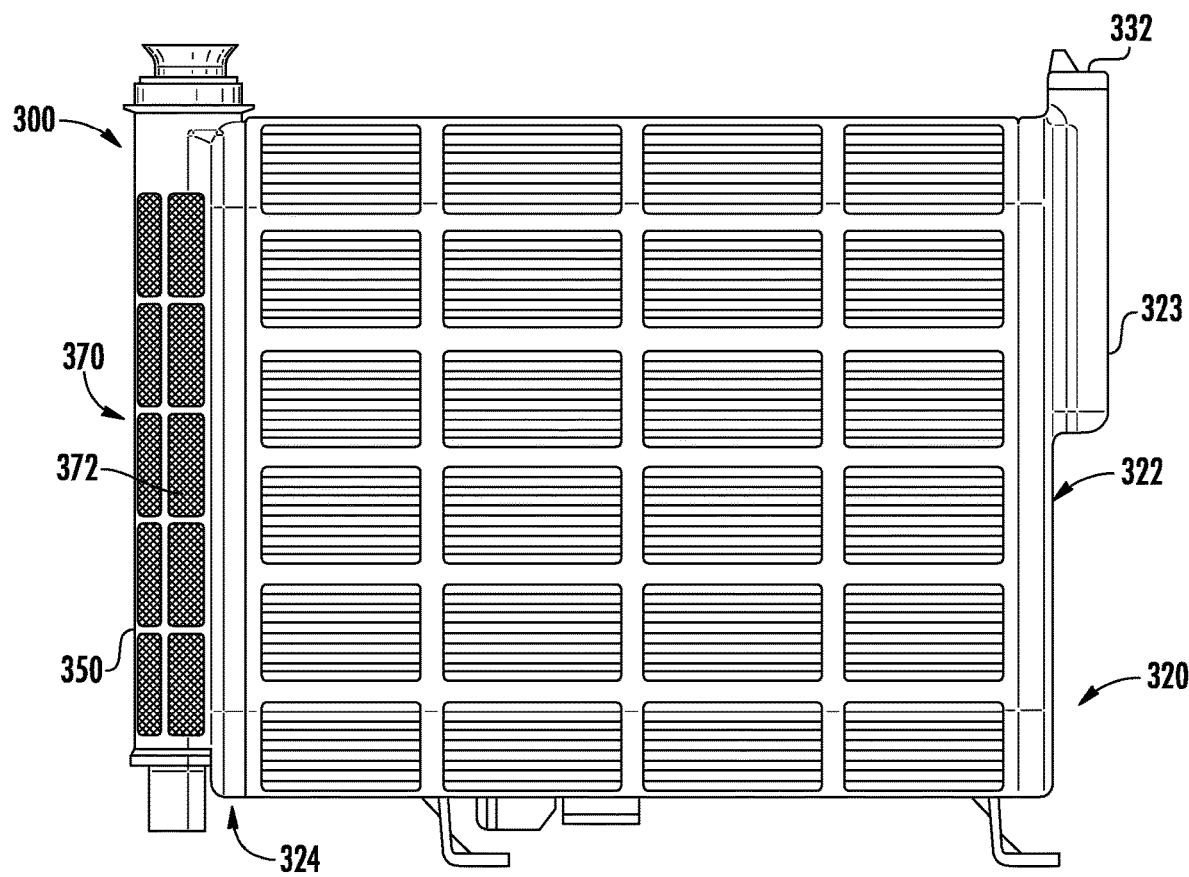
FIG. 11 is a front view of a third embodiment of the filter element according to aspects of the disclosure.
Figure 12:
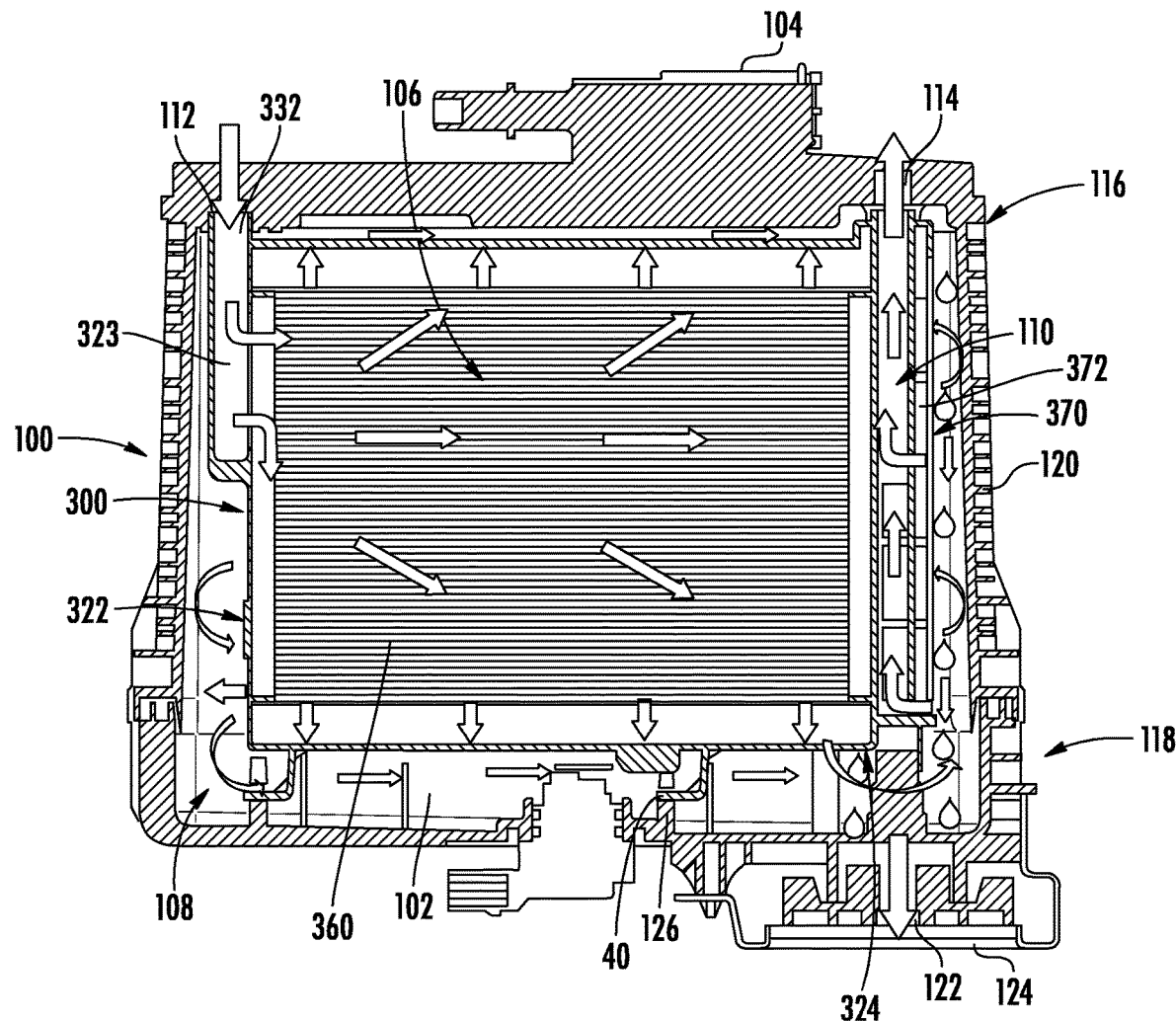
FIG. 12 is a rear cross-sectional view of the filter element of FIG. 11 disposed within a housing and showing the direction of fluid flow.
Figure 13A:
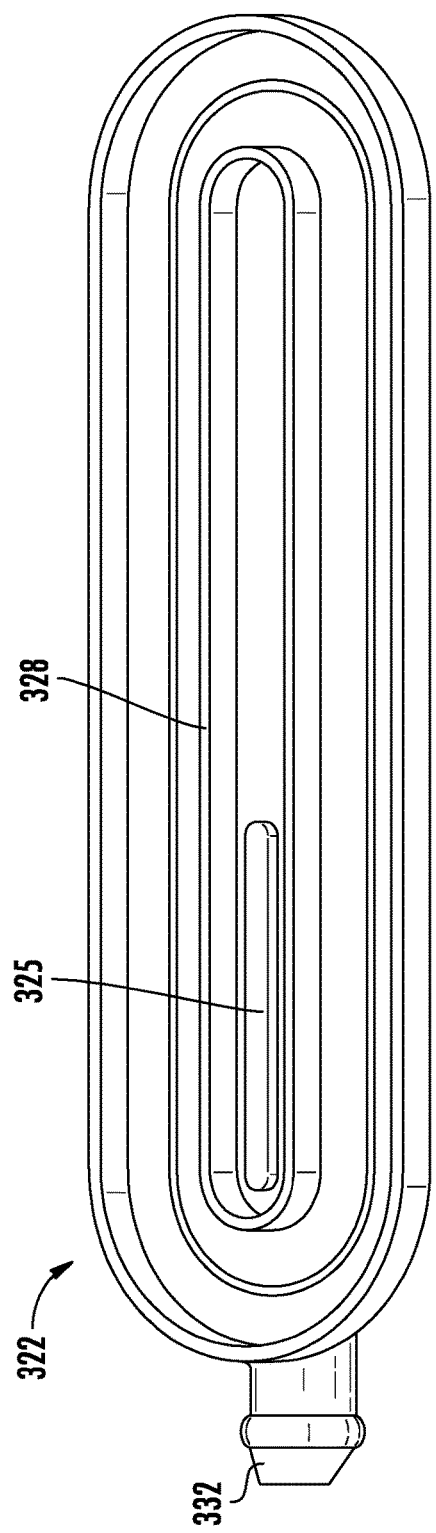
FIG. 13A is a side view of a vertical effluent endcap of the filter element of FIG. 11.
Figure 13B:
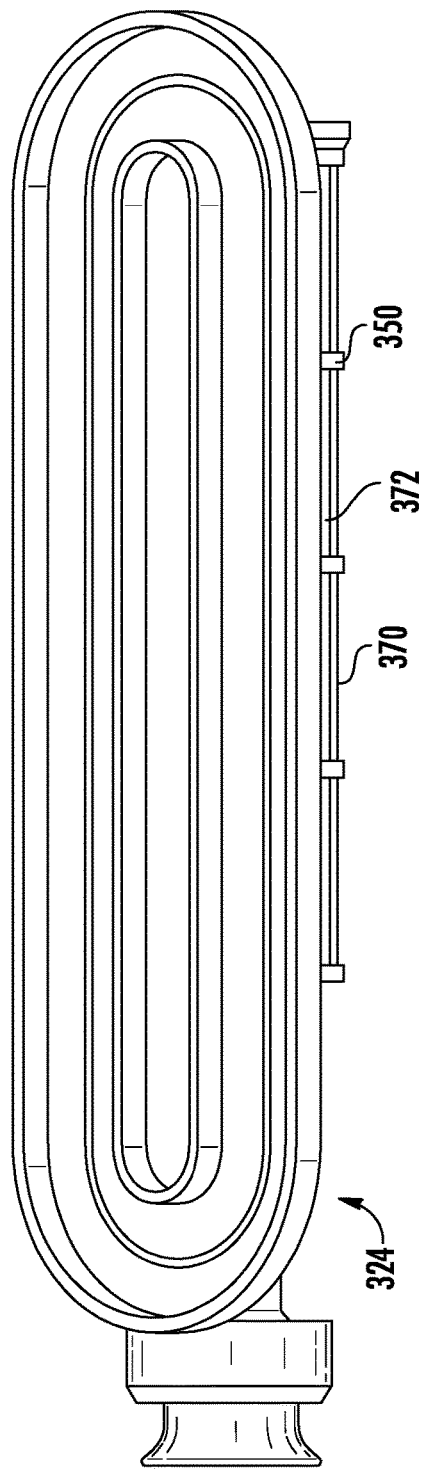
FIG. 13B is a side view of a vertical influent endcap of the filter element of FIG. 11.

As shown in FIGS. 8-10, a second disclosed embodiment the filter element 200 has a frame 220 including a peripheral wrapper 250, a upper (first) endcap 222 and a lower (second) endcap 24. Filter element 200 differs from filter element 10 primarily in the construction of the upper endcap 222 and peripheral wrapper 250. As shown in FIGS. 8 and 9A-9C, a first embodiment of an upper endcap 222 is constructed from two components, an outer endcap 221 and an endcap insert 223. The endcap insert 223 is received in a peripheral rim 226 of the outer endcap 221 and held in a position spaced from the outer endcap 221 to define an inlet flow path 240. The inlet flow path 240 extends from the inlet 232 on the outer endcap 221 through opening 233 to the dirty fuel region 106 surrounded by the ring of filter media 260. The peripheral rim 226 of the outer endcap 221 includes a plurality of inwardly projecting tabs 229 for forming a snap-fit connection with the endcap insert 223. The outer endcap 221 includes a plurality of stand-offs 236 projecting from an inside surface 237 toward the filter media 260. As shown in FIG. 9B, the stand-offs 236 include two longitudinally oriented rows 236a arranged between two outer laterally oriented rows 236b. The laterally oriented stand-offs 236b extend inwardly from the peripheral rim 226 and axially from the inner surface 237. Additional outer stand-offs 236c are semi-circular and disposed about the peripheral rim 226 adjacent the dirty fuel inlet 232 and about an arcuate lip 238. The insert 223 includes a radially projecting panel 231, the peripheral edge of which is trapped between the stand-offs 236 and the tabs 229 in a snap fit. Although a specific configuration of stand-offs are illustrated, any arrangement of stand-offs that serves the purpose of supporting the endcap insert in a spaced apart relationship to the outer endcap is compatible with the disclosure. As shown in FIG. 9C, the endcap insert 223 includes an inner rim 228 axially extending from the obround panel 231. The inner rim 228 defines a channel 235 in communication with opening 233, where channel 235 guides fuel into the dirty fuel region 106. The peripheral rim 226 and arcuate lip of the outer endcap 221 cooperate with the inner rim 228 to define a track 230 that receives an axial end of the ring of filter media 260.

FIGS. 9D-9F illustrate an alternative embodiment of an upper endcap 222, where the arcuate wall 238 (shown in FIGS. 9B and 9C) is omitted. The endcap insert 223 extends the full length of the outer endcap 221 and is supported by standoffs 236 to define a flow path 240 extending between inlet 232 and openings 233 communicating with channel 235 into the dirty fuel region 106. As shown in FIG. 9E, outer endcap 221 includes an outlet tube 74 and an air management post 81. Outlet tube 74 defines a clean dry fuel outlet and includes air bleed holes 84. The air management post 81 defines an orifice 83 extending through the outer endcap 221. The air management post 81 has an axial length that spans the distance between an outside surface of the outer endcap 221 through the endcap insert 223 and adhesive 258 dispensed into the upper endcap 222 during assembly of the filter element 200. The outlet tube 74 and air management post 81 extend through openings defined by the panel 231 of the endcap insert 223. In this arrangement, fuel flows from inlet 232 into the flow path 240 between the outer endcap 221 and the endcap insert 223, and out openings 233 and channel 235 into the dirty fuel region 106. In all other respects, filter element 200 functions in the same manner as filter element 10 described above. By defining the flow path 240 for incoming fuel, flattening and/or opening one or more pleats of the filter media 60 to accommodate the dirty fuel inlet 32, as disclosed with respect to filter element 10 is no longer required. As the filter housing 100 fills with fuel, air management post 81 allows air at the top of the filtration chamber 102 to pass axially through the upper endcap 222 into the upper end of the water separator 270 adjacent the air bleed holes 84, where the air can leave the filter assembly in a controlled manner.

Figure 7A:
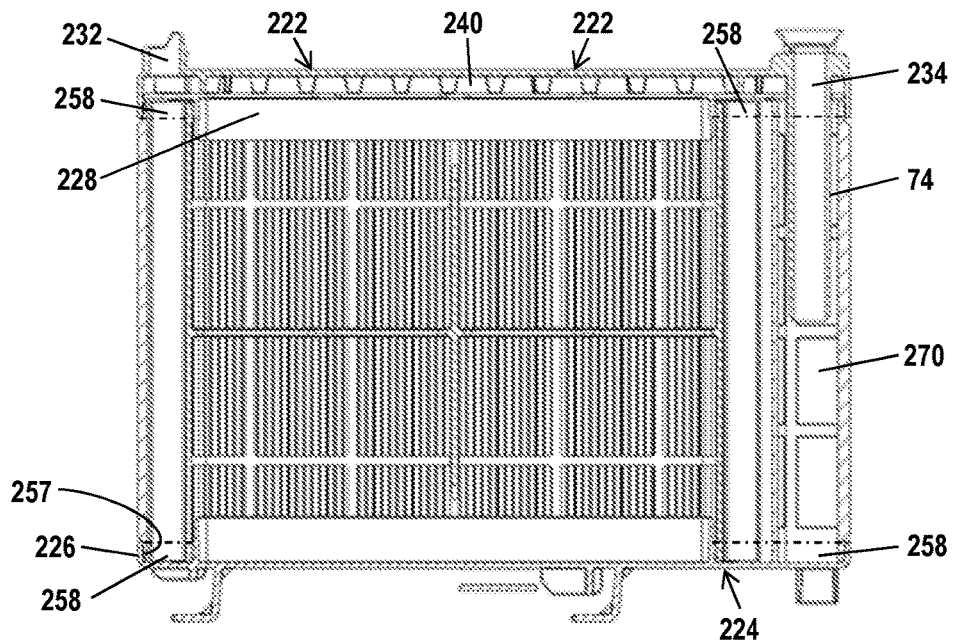
FIG. 7A is a sectional view of an alternative filter element configuration according to aspects of the disclosure.
Figure 7B:
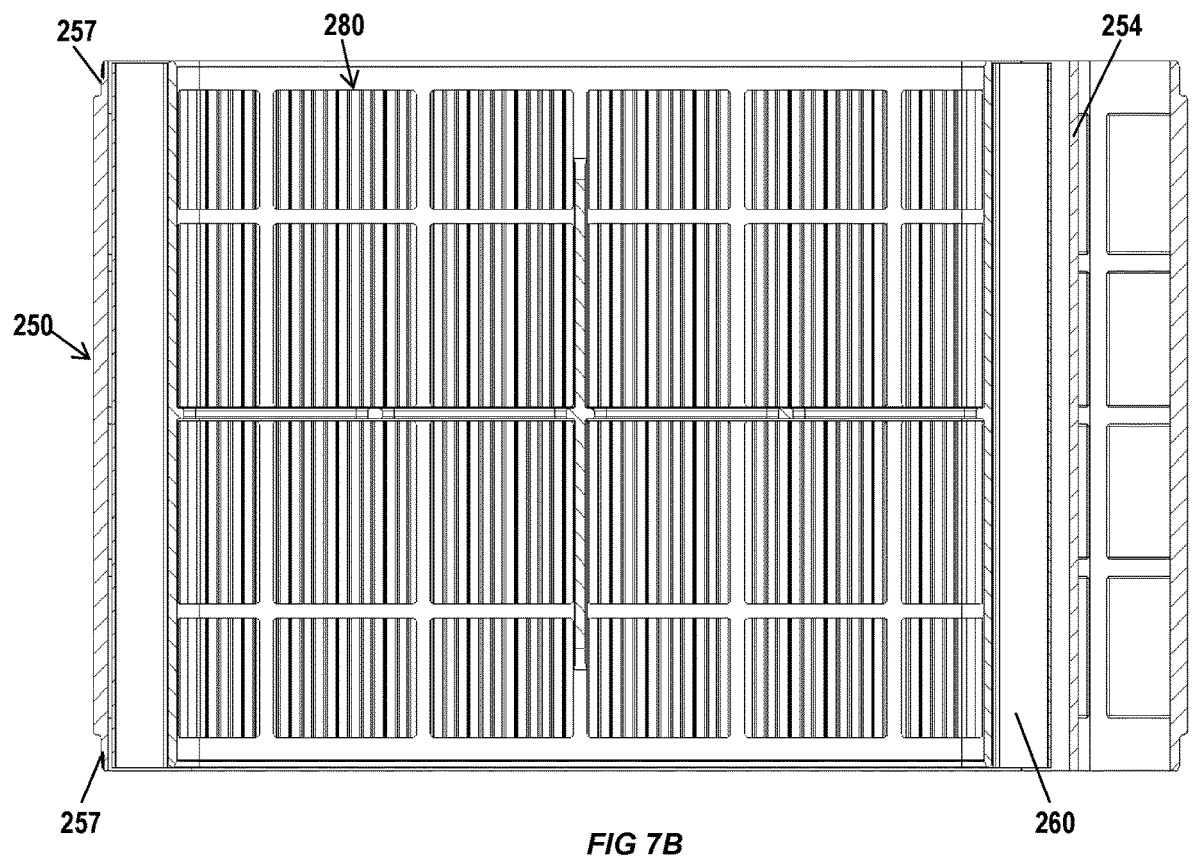
FIG. 7B is an enlarged sectional view of a subassembly of the alternative filter element of FIG. 7A with the upper and lower endcaps removed for clarity.
Figure 7C:
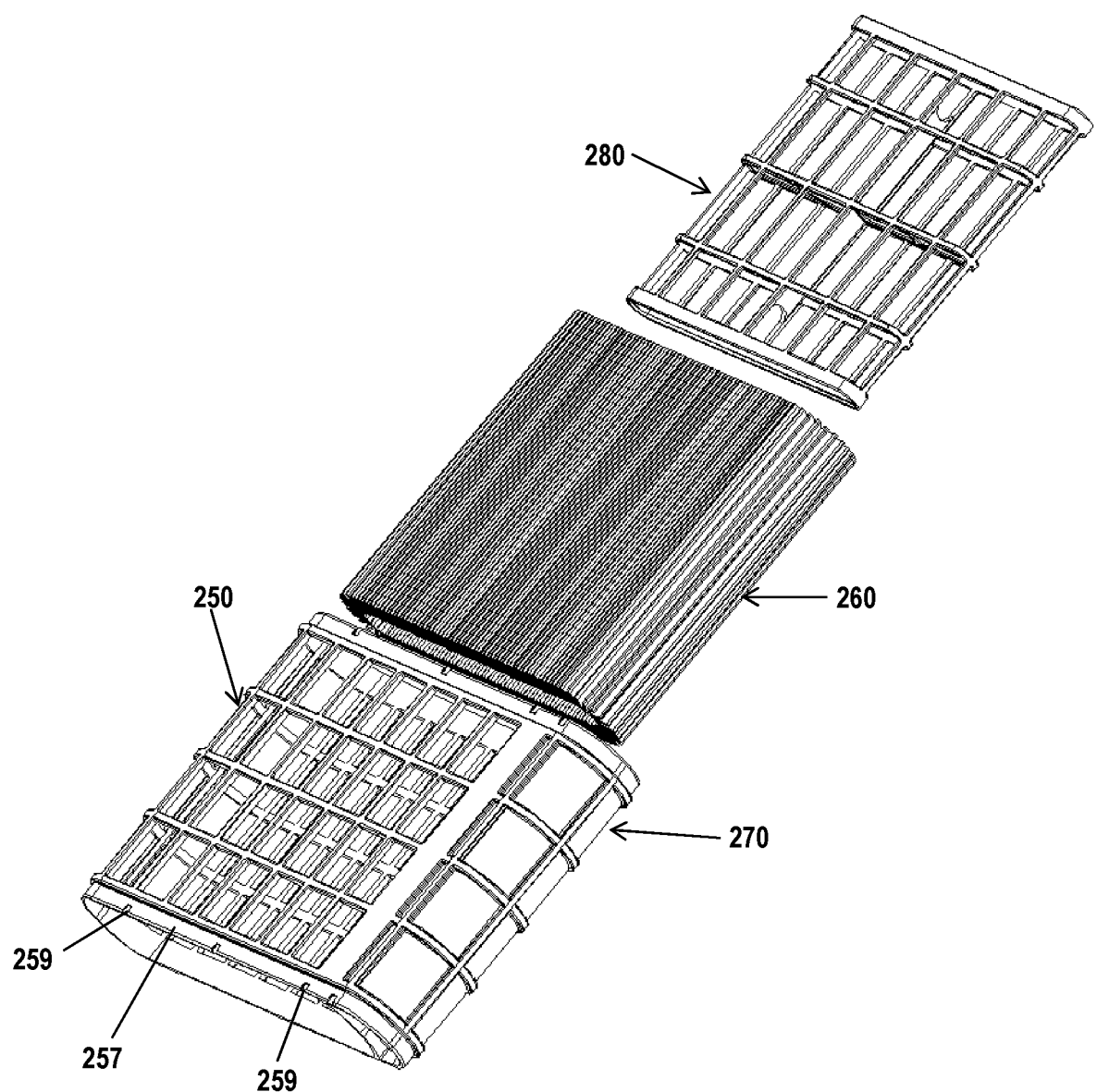
FIG. 7C is an exploded view showing the components of the subassembly of FIG. 7B.

FIGS. 7A-7C illustrate a subassembly compatible with filter elements 10 and 200. As shown in FIG. 7C, the subassembly includes a center tube 280, an obround ring of filter media 260, a peripheral wrapper 250 and integrated water separator 270. The peripheral wrapper 250 includes an arcuate wall 254 isolating the water separator 270 from the clean wet region 108 outside the ring of filter media 260. Hydrophobic mesh 272 is overmolded on ribs 252 of the peripheral wrapper 250 at the end corresponding to the water separator 270. The peripheral wrapper 250 and arcuate wall 254 include a lip or rim 257 that overlaps with the peripheral rim 226 of the outer endcap 221 and a corresponding rim on the lower endcap 224 As shown in FIG. 7C, the lip 257 may include recesses 259 to prevent interference between the lip 257 and the tabs 229 on the inside surface of the peripheral rim 226 of the outer endcap 221. The arcuate wall 254 extends into adhesive 258 used to connect the ring of filter media 260 and peripheral wrapper 250 to the upper and lower endcaps 222, 224. The peripheral wrapper 250, ring of filter media 260 and center tube 280 form a subassembly as shown in FIG. 7B. To assemble the filter element 200, adhesive 258 is placed in the recess defined by an endcap 222, 224, and one axial end of the subassembly of FIG. 7B is inserted into the adhesive, which is then cured. This process is repeated for the other endcap. The adhesive 258 bonds the endcaps 222, 224, to the ring of filter media 260, center tube 280 and peripheral wrapper 250. The adhesive 258 also forms a sealed connection between the ring of filter media 260 and the endcaps 222, 224.

Figure 15:
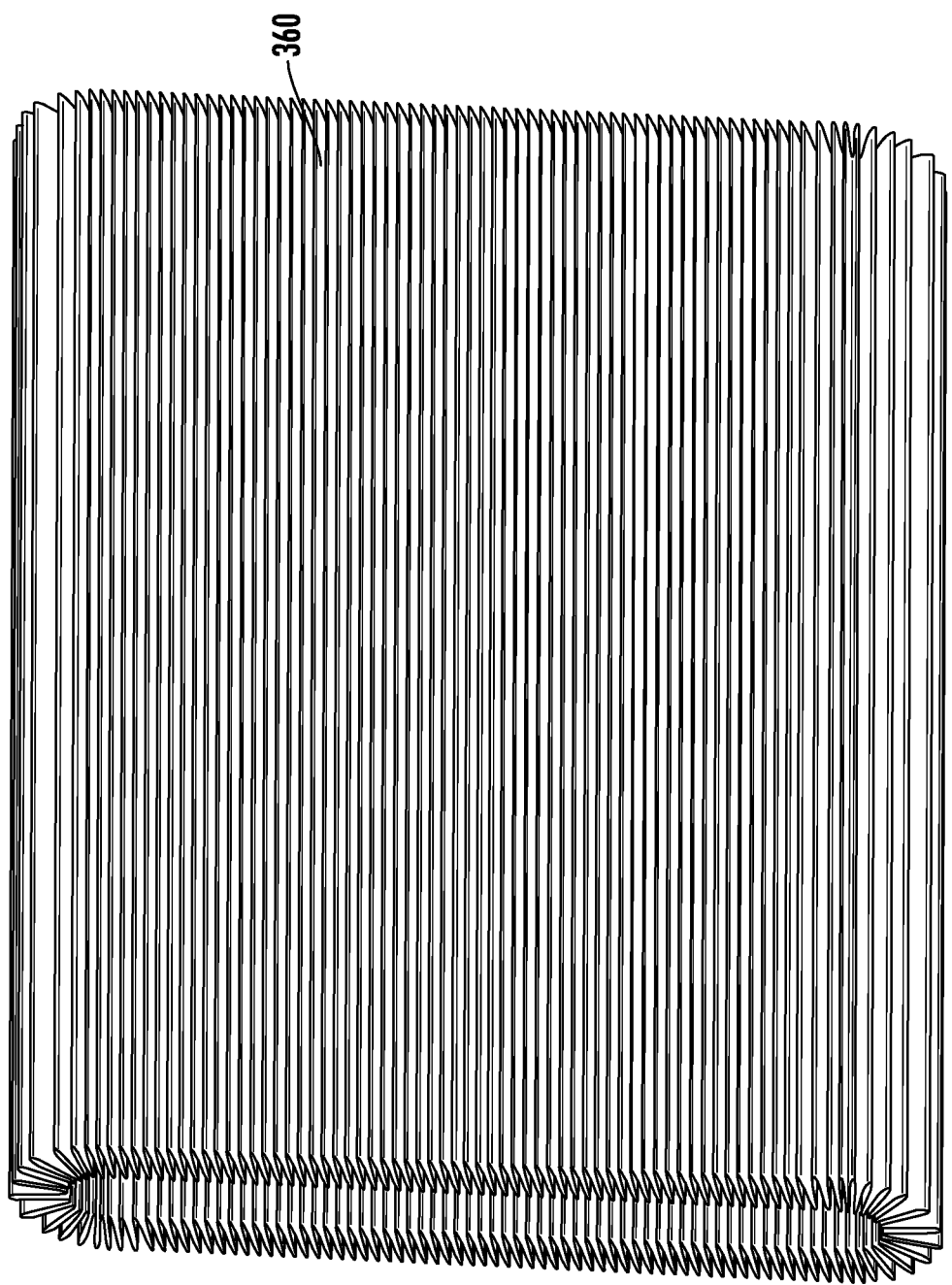
FIG. 15 is a front view of an obround ring of filter media of the filter element of FIG. 11.

As shown in FIGS. 11-15, a third embodiment of a filter element 300 includes a frame 320 comprising a vertical influent (first) endcap 322 and a vertical effluent (second) endcap 324. The influent endcap 322 includes a dirty fuel inlet 332 defined by an externally disposed dirty fuel inlet tube 323. Referring to FIG. 13A, an obround dirty fuel inlet orifice 325 is defined by the influent endcap 322 within an inner rim 328 and is in communication with the dirty fuel inlet tube 323. Influent endcap 322 and effluent endcap 324 include inner and outer rims that define a recessed track for reception of axial ends of the peripheral wrapper, obround ring of filter media 360, and center tube (not shown), which are assembled to the end caps 322, 324 as previously described. A water separator 370 is externally supported by the effluent endcap 324. The water separator 370 is comprised of a hydrophobic mesh 372 overmolded on a semi-cylindrical support grid 350 and an outlet tube 374 which is press-fit and bonded into the cylindrical support 350. An air bleed hole 336 is included at an upper end of the cylindrical support 350 for regulating air in the same way as the air bleed hole 36 in the upper endcap 22 of the first embodiment. As shown in FIG. 15, an obround ring of pleated filter media 360 extends between the influent and effluent endcaps 322, 324 in an orientation which is oriented 90° relative to the filter media 60 disclosed in the first embodiment. In this arrangement, dirty wet fuel enters the dirty fuel inlet tube 323 through the dirty fuel inlet 332 in the influent endcap 322. The dirty wet fuel flows through the dirty fuel inlet orifice 325 to the dirty fuel region 106 where the dirty wet fuel is filtered as described above in the first embodiment. Water is then separated from the clean wet fuel in the manner described above with respect to the first disclosed embodiment.

Figure 16A:
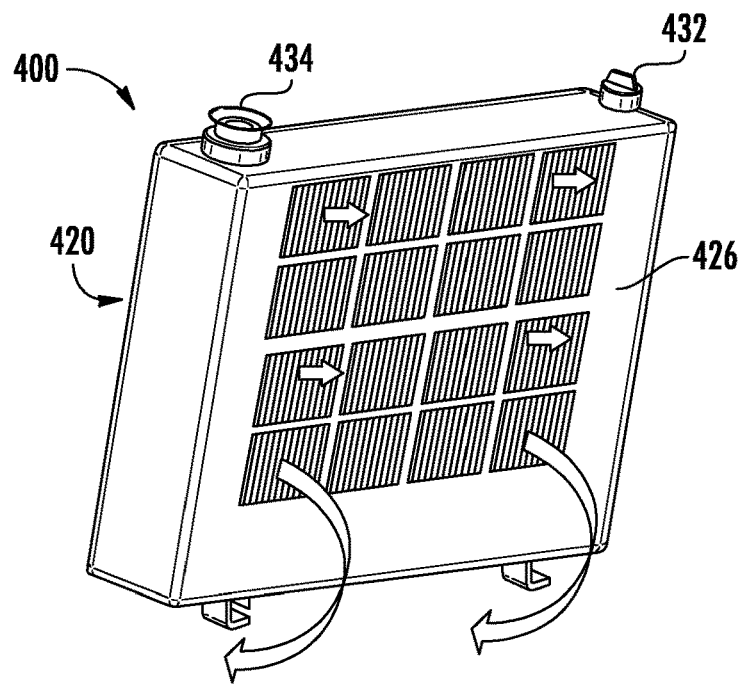
FIG. 16A is a front perspective view of a fourth embodiment of the filter element according to aspects of the disclosure.
Figure 16B:
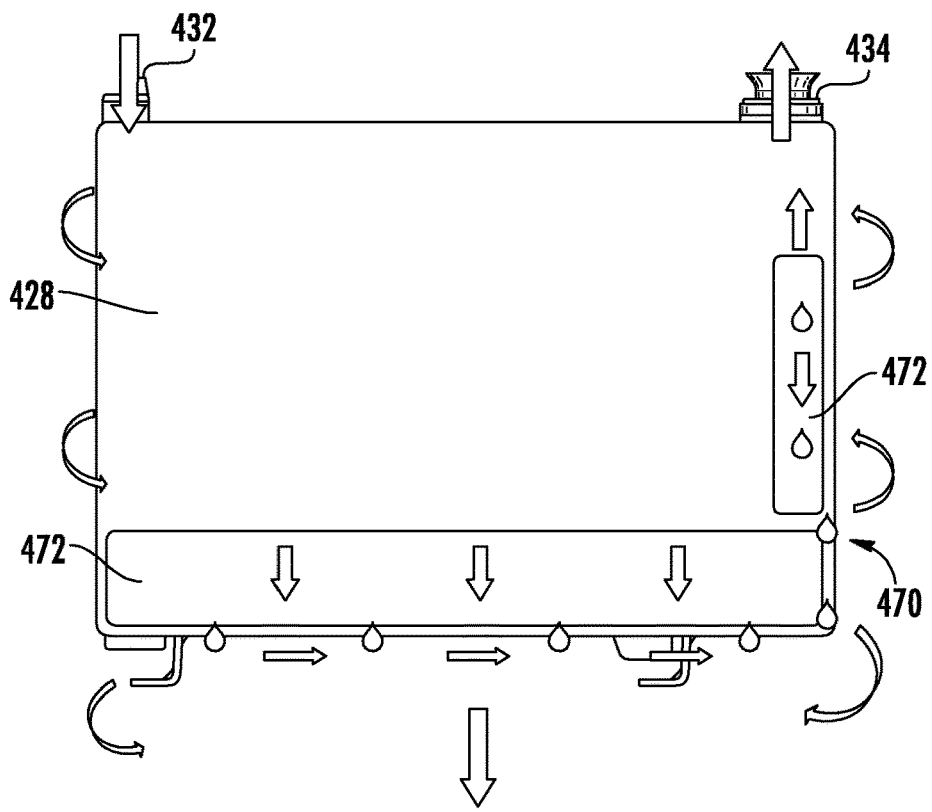
FIG. 16B is a rear view of the filter element of FIG. 16A.
Figure 17:
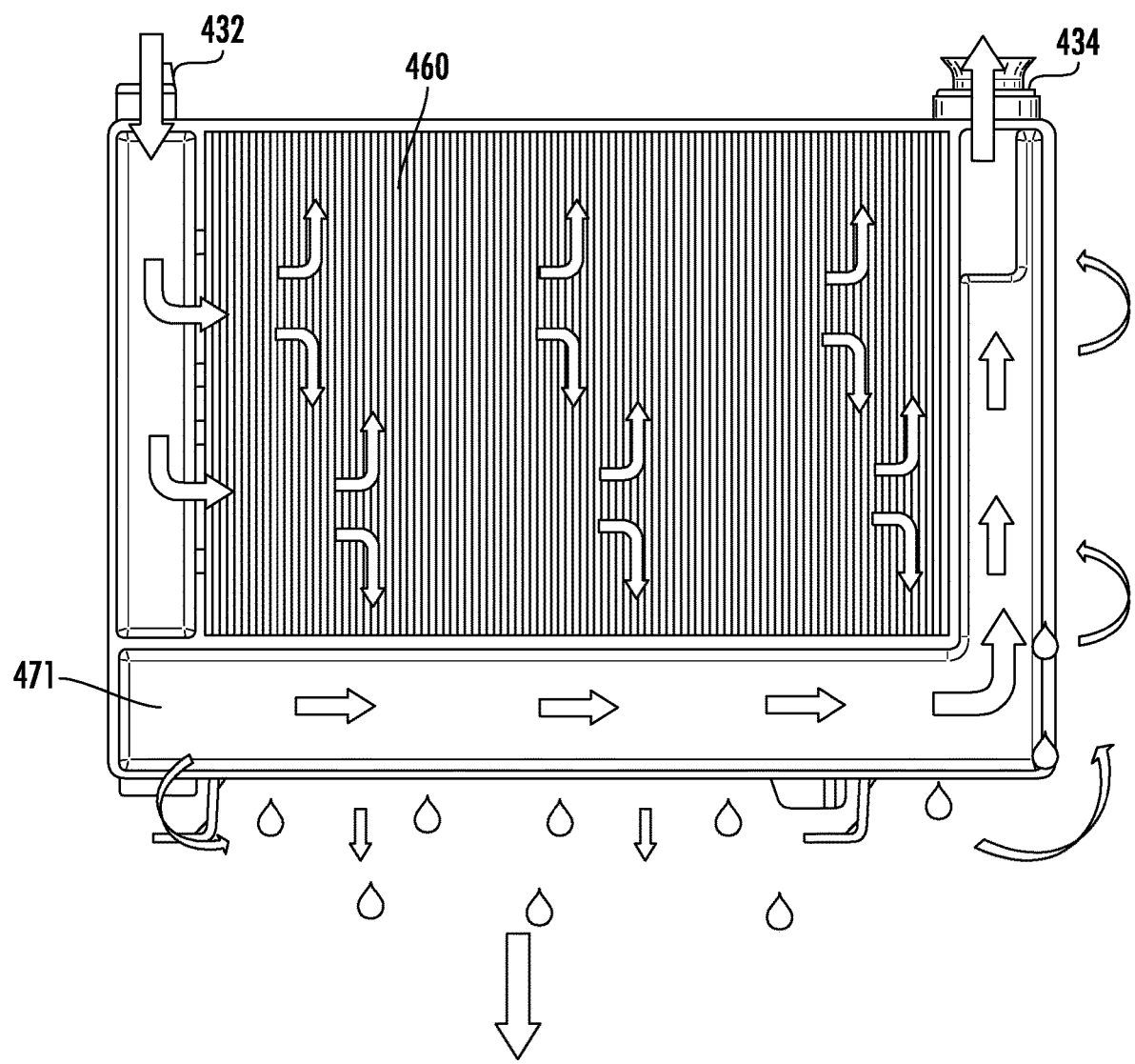
FIG. 17 is a rear cross-sectional view of the filter element of FIG. 16A showing the direction of fluid flow.

As illustrated by FIGS. 16A-17, a fourth embodiment a filter element 400 includes a frame 420 comprising a open front (first) panel 426 including a support grid and a rear (second) panel 428 having both permeable and impermeable portions. The frame 420 also defines a dirty fuel inlet 432 and a clean fuel outlet 434. A panel of pleated filter media 460 is disposed within the frame 420 adjacent the front panel 426 and supported by the grid. A dirty wet fuel region is defined between the filter media 460, the frame 420, and the impermeable portion of the rear panel 428. Fuel flows outwardly through the filter media 460, removing particulates and coalescing water. A water separator 470 is defined below the filter media 460, including hydrophobic mesh 472 below and adjacent to the impermeable portion of the rear panel 428. A clean dry fuel region 471 is defined within the frame 420 and behind the hydropobic mesh 472. The clean dry fuel region 471 is in communication with the clean fuel outlet 434. In this arrangement, fuel flows outwardly through the filter media 460 into the filtration chamber defined by the housing 100. Clean wet fuel fills a clean wet fuel region defined between the filter element 400 and the housing 100. The clean wet fuel flows inwardly through the hydrophobic mesh 472 into the clean dry fuel region 471 within the water separator 470. Clean dry fuel flows out of the filter element 400 through the clean fuel outlet 434, which may be provided with an outlet tube and air management arrangements as described above.

Figure 18:
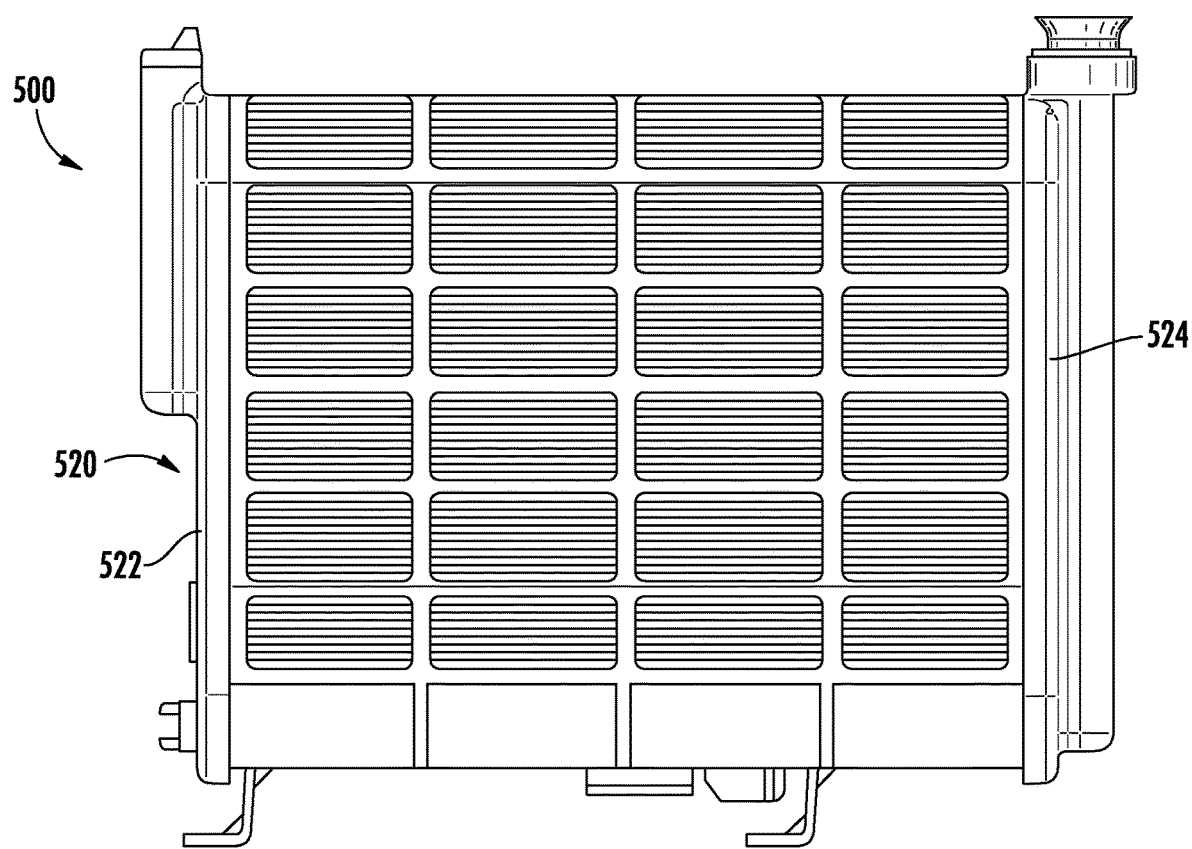
FIG. 18 is a rear view of a fifth embodiment of the filter element according to aspects of the disclosure.
Figure 19:
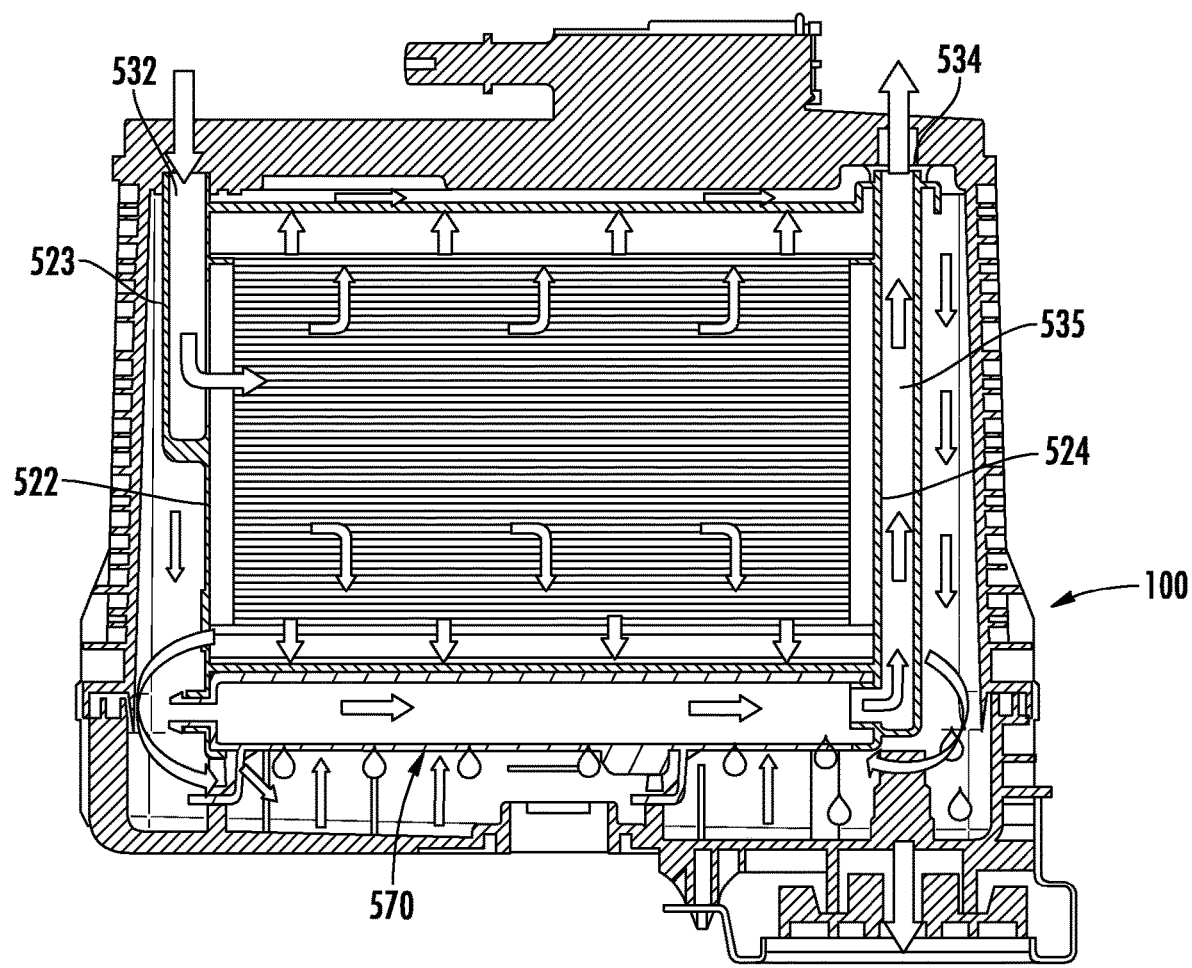
FIG. 19 is a rear cross-sectional view of the filter element of FIG. 18 disposed within the housing and showing the direction of fluid flow.
Figure 20:
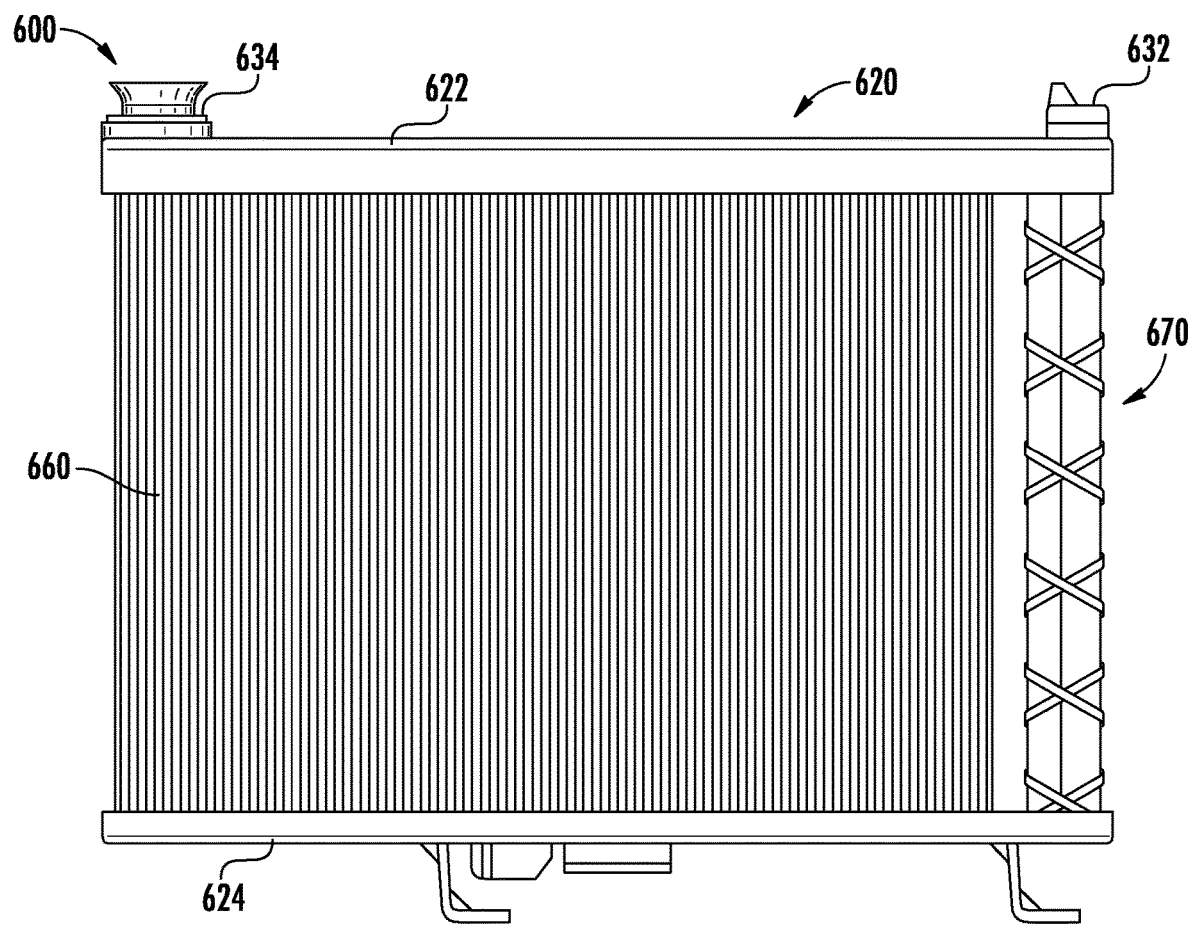
FIG. 20 is a front view of a sixth embodiment of the filter element according to aspects of the disclosure.
Figure 21:
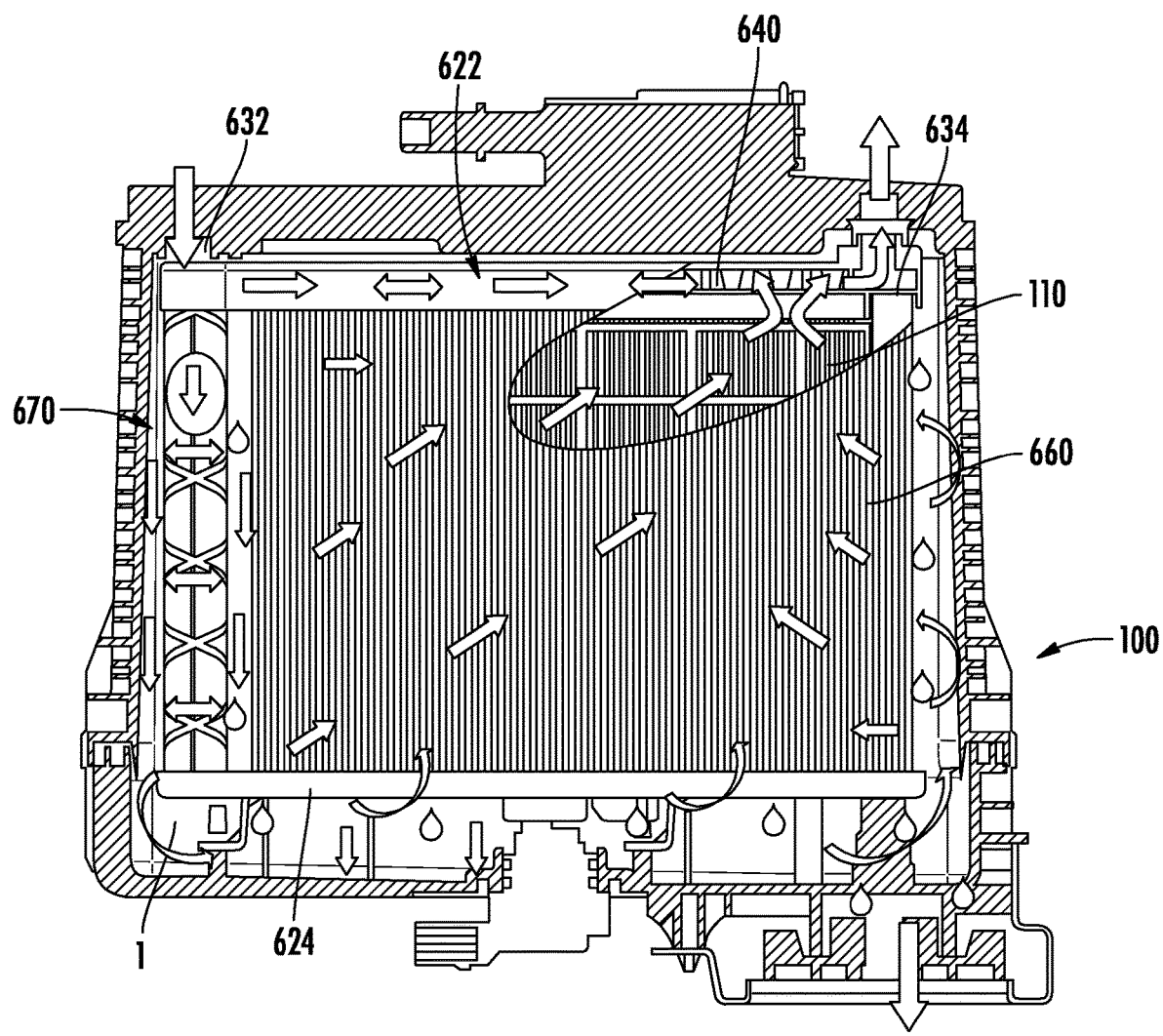
FIG. 21 is a rear cross-sectional view of the filter element of FIG. 20 disposed within the housing and showing the direction of fluid flow.
Figure 22A:
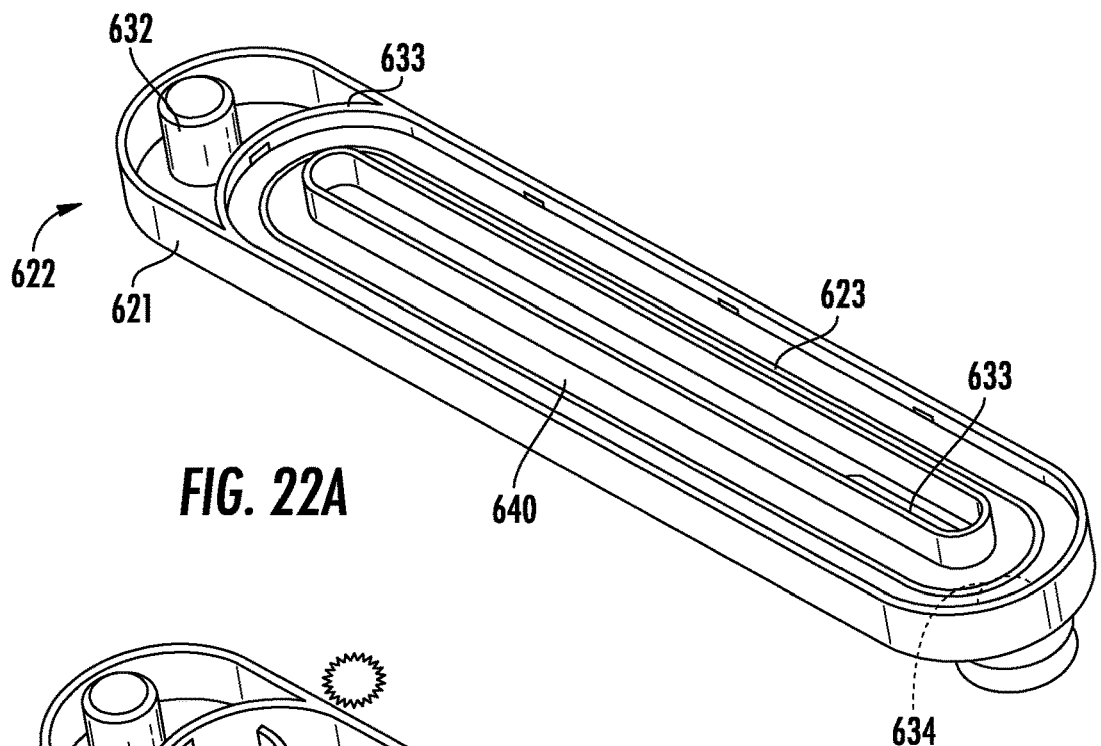
FIG. 22A is a bottom perspective view of a modular upper endcap of the filter element of FIG. 20.
Figure 22B:
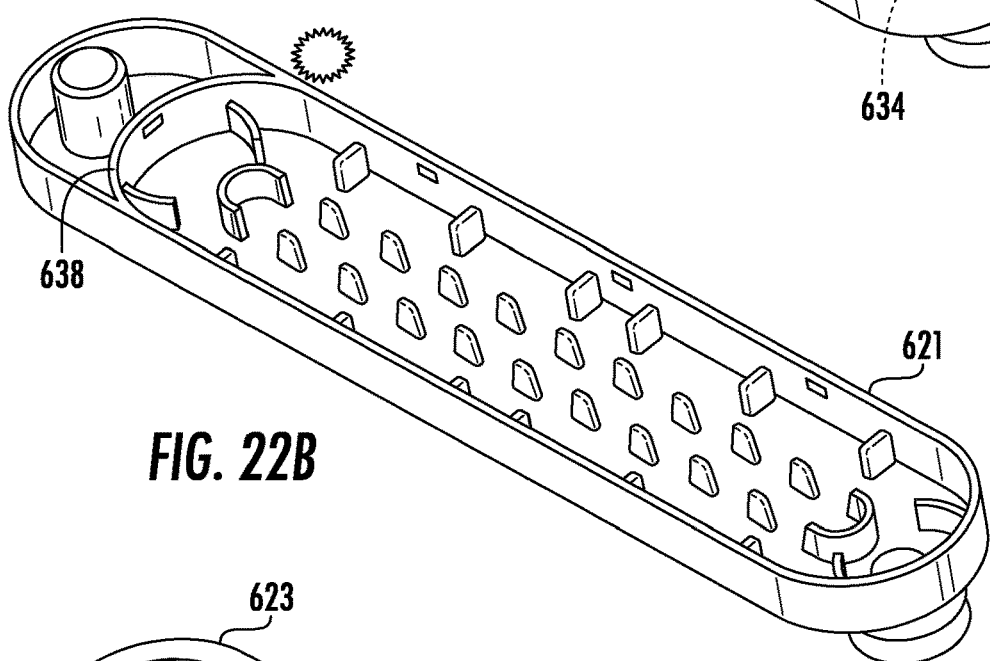
FIG. 22B is a bottom perspective view of an upper endcap of the modular upper endcap of 22A.
Figure 22C:
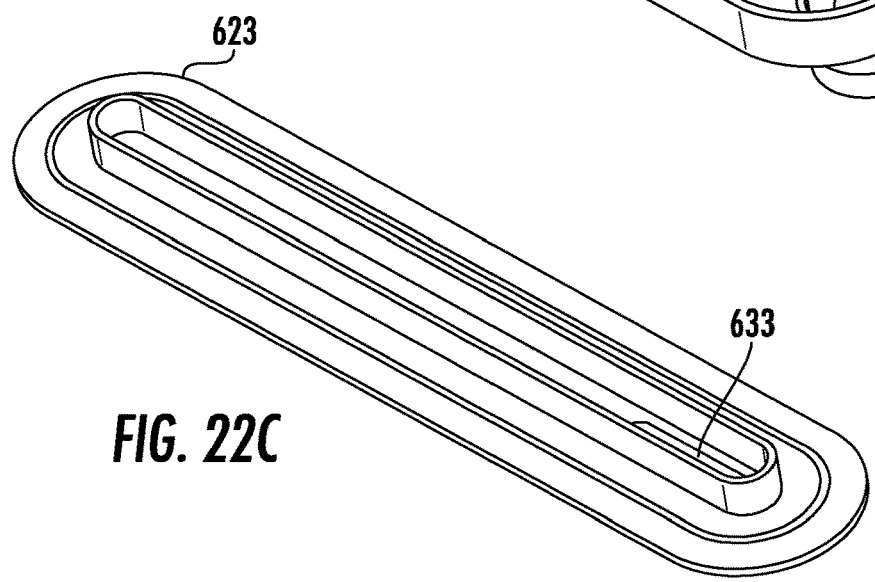
FIG. 22C is a bottom perspective view of an upper endcap of the modular upper endcap of 22A.

As shown in FIGS. 18-19, a fifth embodiment of a filter element 500 includes a frame 520 comprising a vertical influent (first) endcap 522 including a dirty fuel inlet tube 523 defining a dirty fuel inlet 532 substantially similar to the influent endcap 322 of the third embodiment, a vertical effluent (second) endcap 524 defining an clean fuel outlet 534 and an outlet passage 535, and a horizontal water separator 570 disposed at a bottom portion of the filter element 500 in communication with the outlet passage 535. In this arrangement, particulate is separated and water is coalesced from dirty wet fuel in the manner described above for the third embodiment of the filter element 300. Water is separated from clean wet fuel as it flows into through the water separator 570. Clean dry fuel fills a clean dry fuel region defined by the water separator 570 before filling the outlet passage 535 and flowing out of the filter element 500 through the clean fuel outlet 534. The clean fuel outlet 534 may be provided with an outlet tube and air management arrangements as described above.

Figure 23:
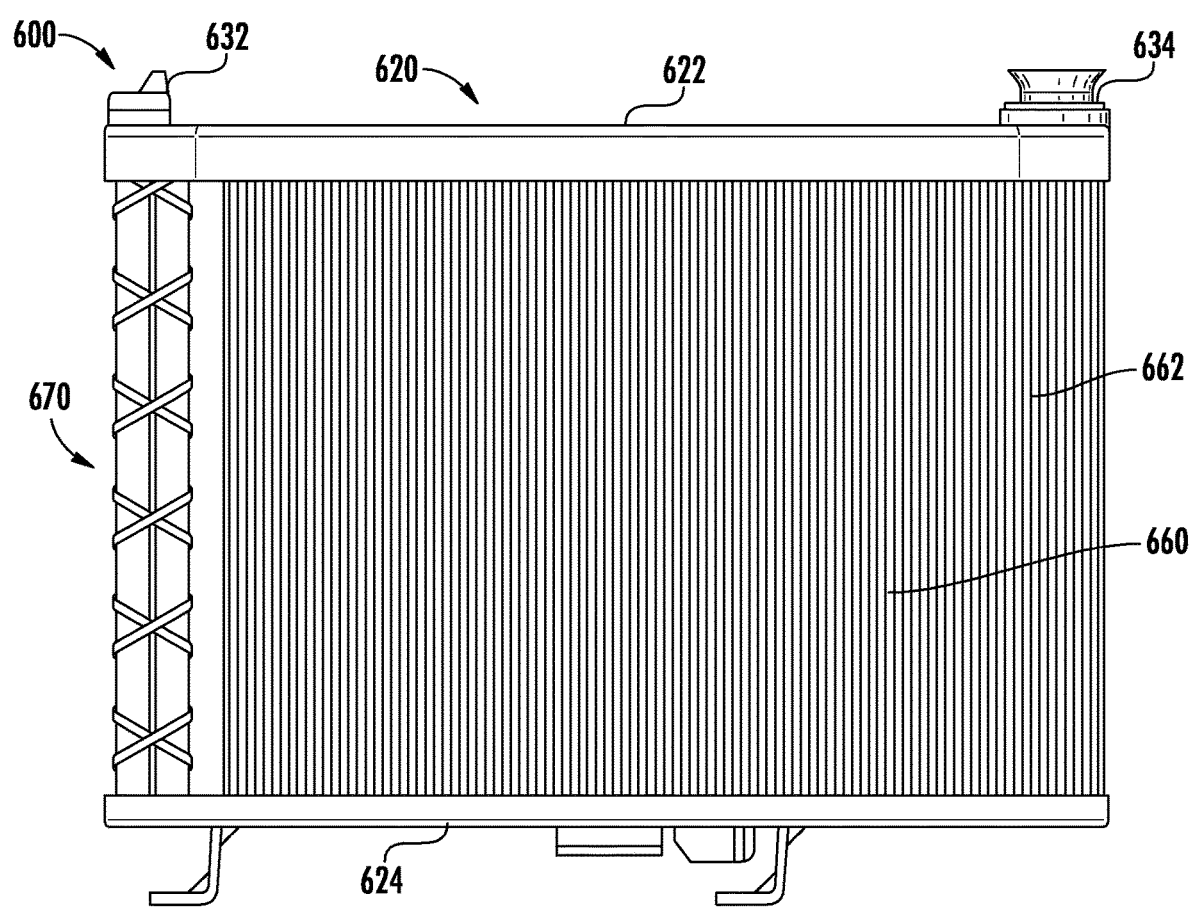
FIG. 23 is a rear view of the filter element of FIG. 20 including a sleeve of hydrophobic mesh.
Figure 24:
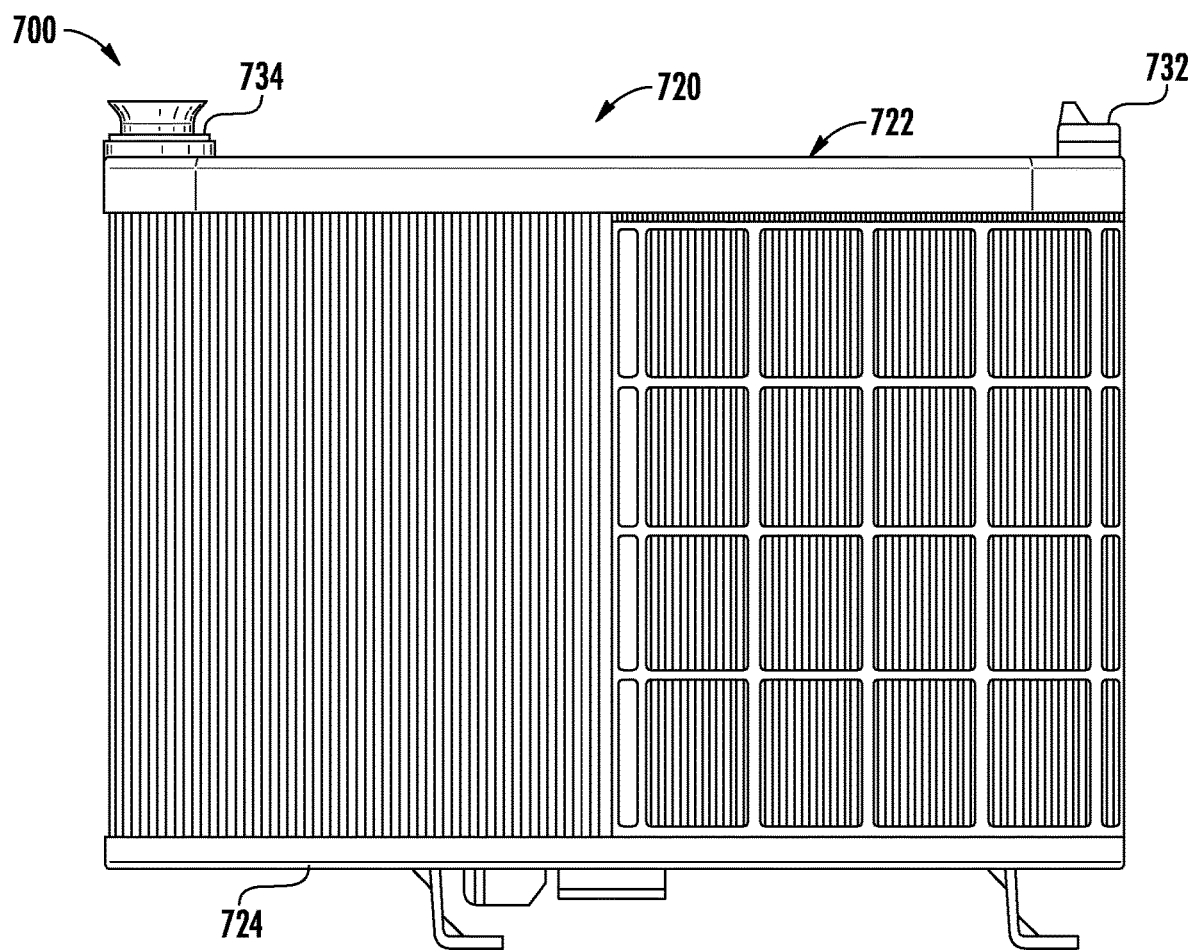
FIG. 24 is a front view of a seventh embodiment of the filter element according to aspects of the disclosure.
Figure 25:
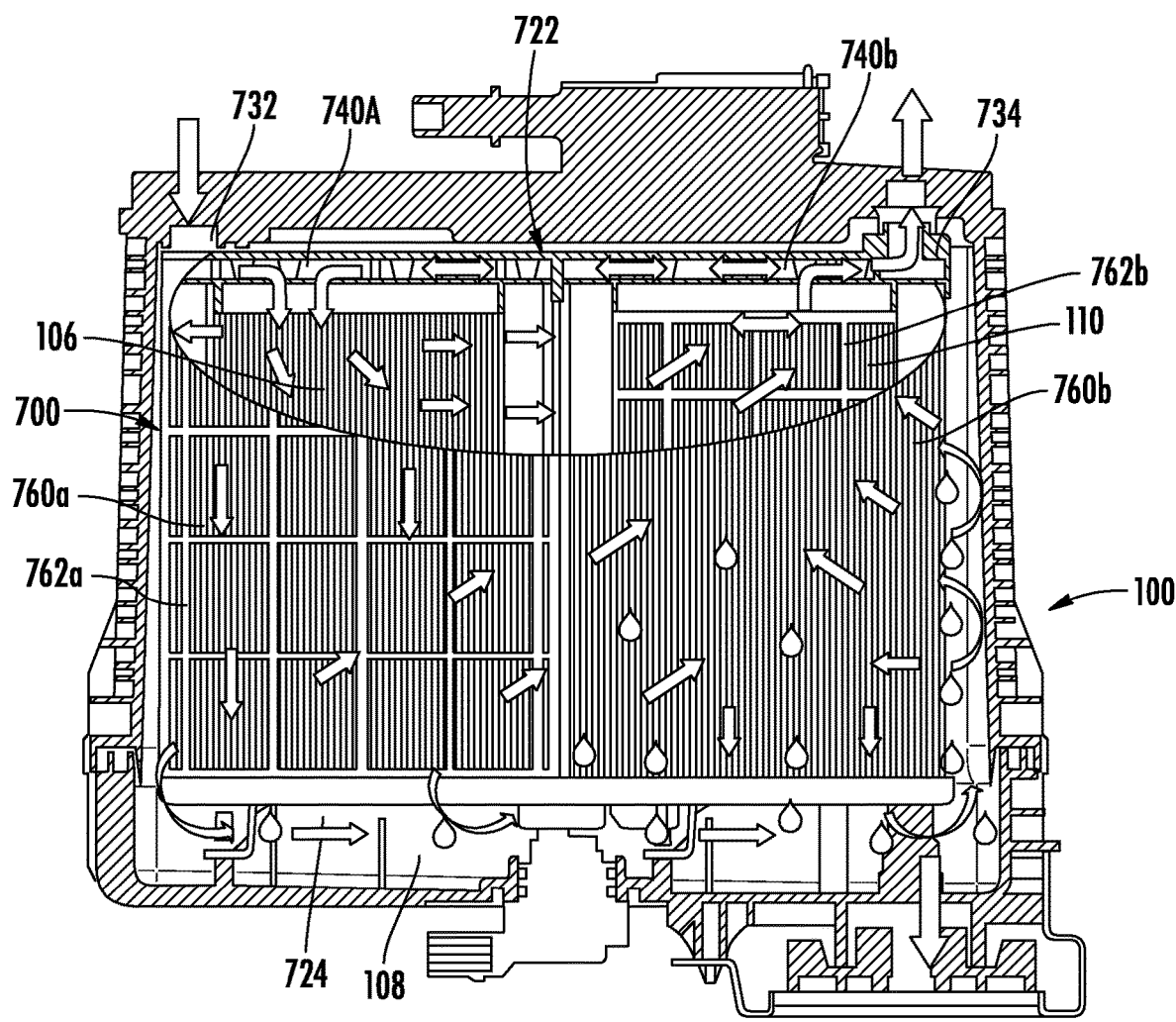
FIG. 25 a rear cross-sectional view of the filter element of FIG. 24 disposed within the housing and showing the direction of fluid flow.

As illustrated in FIGS. 20-23, a sixth embodiment of a filter element 600 includes an arrangement which is substantially similar to the second embodiment of the filter element 200. Like the second embodiment, the filter element 600 includes a frame 620 comprising a modular upper (first) endcap 622 and a lower (second) endcap 624. The modular upper endcap 622 is comprised of an outer endcap 621 and an endcap insert 623. Referring to FIGS. 22A-22C, key differences between the modular upper endcap 622 of the sixth embodiment and the modular upper endcap 222 of the second embodiment are that a dirty fuel inlet 632 and clean fuel outlet 634 of the modular upper endcap 622 of the sixth embodiment are swapped in relation to the second embodiment such that the dirty fuel inlet 632 of the modular upper endcap 622 is adjacent an arcuate lip 638 of the upper endcap 621 and the clean fuel outlet 634 is positioned in communication with a flow path 640 defined between the outer endcap 621 and an the endcap insert 623. In filter element 600, a coalescing tube 670 extends from the dirty fuel inlet 632 for coalescing water and filtering large particulate from dirty wet fuel. The filtration tube 670 may include a hydrophobic or hydrophilic mesh. In this arrangement, dirty wet fuel flows into the coalescing tube 670 through the dirty fuel inlet 632. Clean wet fuel flows out of the coalescing tube 670 into a clean wet fuel region between the filter element 600 and the filter housing 100. Partially filtered wet fuel flows inwardly through an obround ring of filter media 660, which may include a hydrophobic treatment or wrap to separate water outside of the filter media 660. As shown in FIG. 23, a sleeve of hydrophobic mesh 662 may surround the filter media 660 to increase the water separation capability of the filter media 660. Clean dry fuel fills a clean dry fuel region 110 defined within the filter media 660 between the modular upper endcap 622 and the lower endcap 624. The clean dry fuel flows through a clean dry fuel orifice 633 defined by the upper endcap insert 623. Clean dry fuel fills the flow path 640 and flows out of the filter element 600 through the clean fuel outlet 634.

Figure 27:
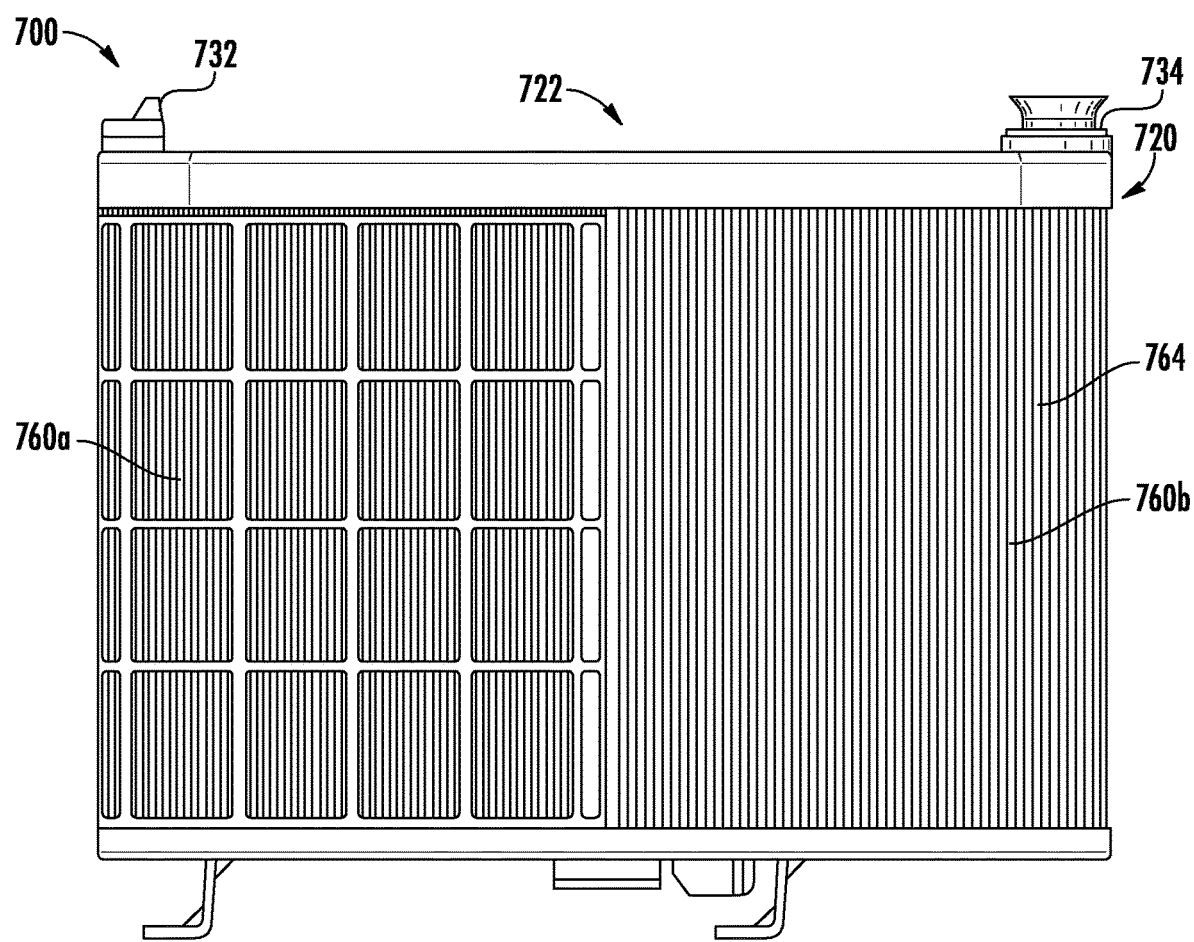
FIG. 27 is a rear view of the filter element of FIG. 24 including a sleeve of hydrophobic mesh.

As depicted in FIGS. 24-27, a seventh embodiment of a filter element 700 includes a frame 720 comprising a binary modular upper (first) endcap 722 and a lower (second) endcap 724. Referring to FIGS. 26A-26C, the binary modular upper endcap 722 is similar to the modular upper endcap 222 of the second embodiment of the filter element 200 in structure and function, but includes an outer endcap 721 having an influent side 725a and an effluent side 725b. The influent and effluent sides 725a, 725b each include an arcuate lip 738a, 738b and separate influent and effluent upper endcap inserts 723a, 723b, respectively, to define separate influent and effluent flow paths 740a, 740b. The influent and effluent sides 725a, 725b of the outer endcap 721 and the influent and effluent upper endcap inserts 723a, 723b are mirror images of each other. The influent side 725a of the upper endcap 721 includes a dirty fuel inlet 732 in communication with a dirty fuel inlet orifice 733a of the influent upper endcap insert 723a. The effluent side 725b of the upper endcap 721 includes a clean dry fuel outlet 734 in communication with a clean dry fuel outlet orifice 733b of the effluent upper endcap insert 723b. The influent and effluent flow paths 740a, 740b are each in communication with separate influent and effluent obround rings of pleated filter media 760a, 760b. Influent and effluent filter media 760a, 760b may be selected to cooperatively remove particulates from fuel flowing through the filter element 700. The influent filter media 760a defines a dirty wet fuel region 106 and is surrounded by a support cage 762a to withstand an inside-out flow of fuel which separates particulate and coalesces water from dirty wet fuel. A clean wet fuel region 108 is defined between the influent and effluent filter medias 760a, 760b and the housing 100. The effluent filter media 760b defines a clean dry fuel region 110 and surrounds a support cage 762b to withstand an outside-in flow of fuel which separates water from clean wet fuel. As shown in FIG. 27, a sleeve of hydrophobic mesh 764 may surround the effluent filter media 760b to increase the water separation capability of the effluent filter media 760b. In this arrangement, dirty wet fuel flows in through the dirty wet fuel inlet 732 and fills the influent flow path 740a. The dirty wet fuel flows through the dirty fuel orifice 733a, fills the dirty wet fuel region 106 and flows outward through the influent filter media 760a. Clean wet fuel fills the clean wet fuel region 108 and flows through the effluent filter media 760b, filling the clean dry fuel region 110 with clean dry fuel. The clean dry fuel flows through the clean fuel orifice 733b, fills the effluent flow path 740b, and flows out of the filter element 700 through the clean fuel outlet 734. The clean fuel outlet 734 may be provided with an outlet tube and air management features as described above.

Figure 28:
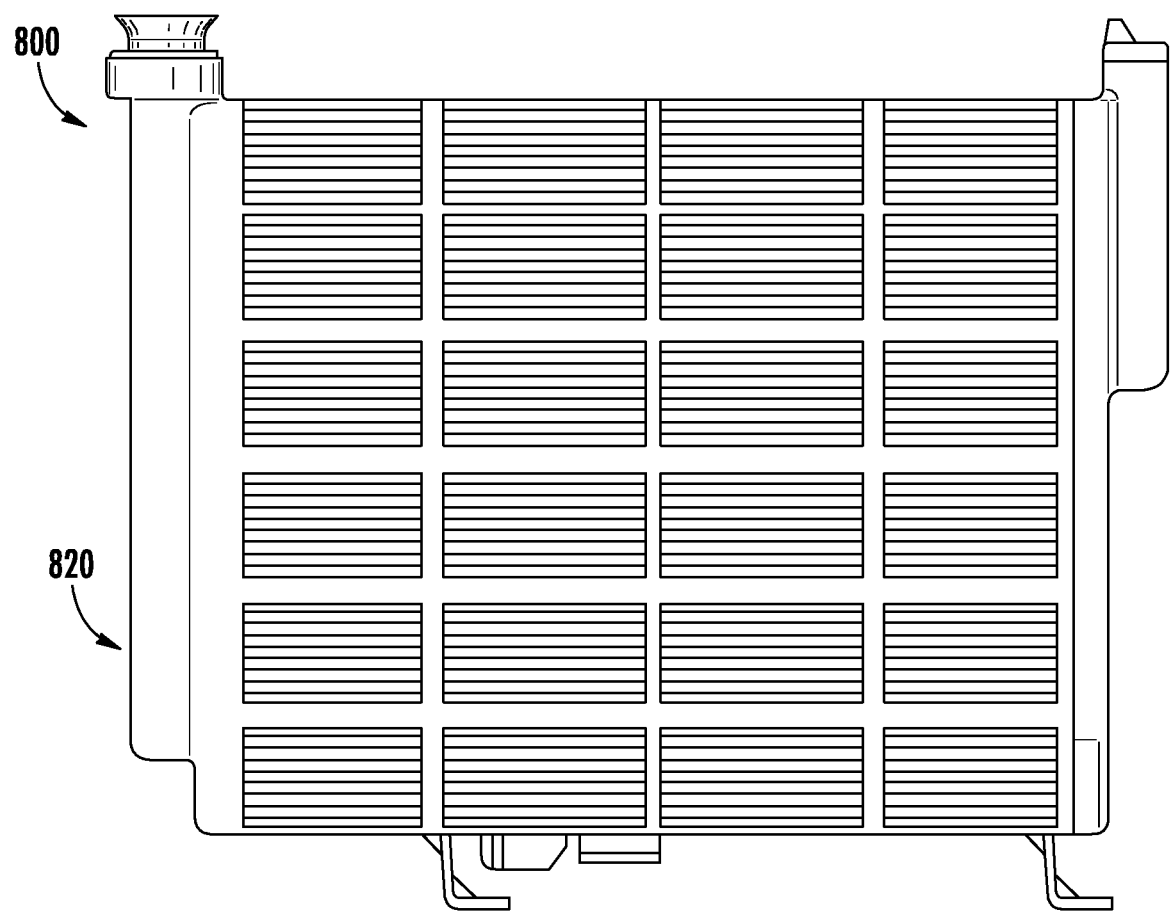
FIG. 28 is a front view of an eighth embodiment of the filter element according to aspects of the disclosure.
Figure 29:
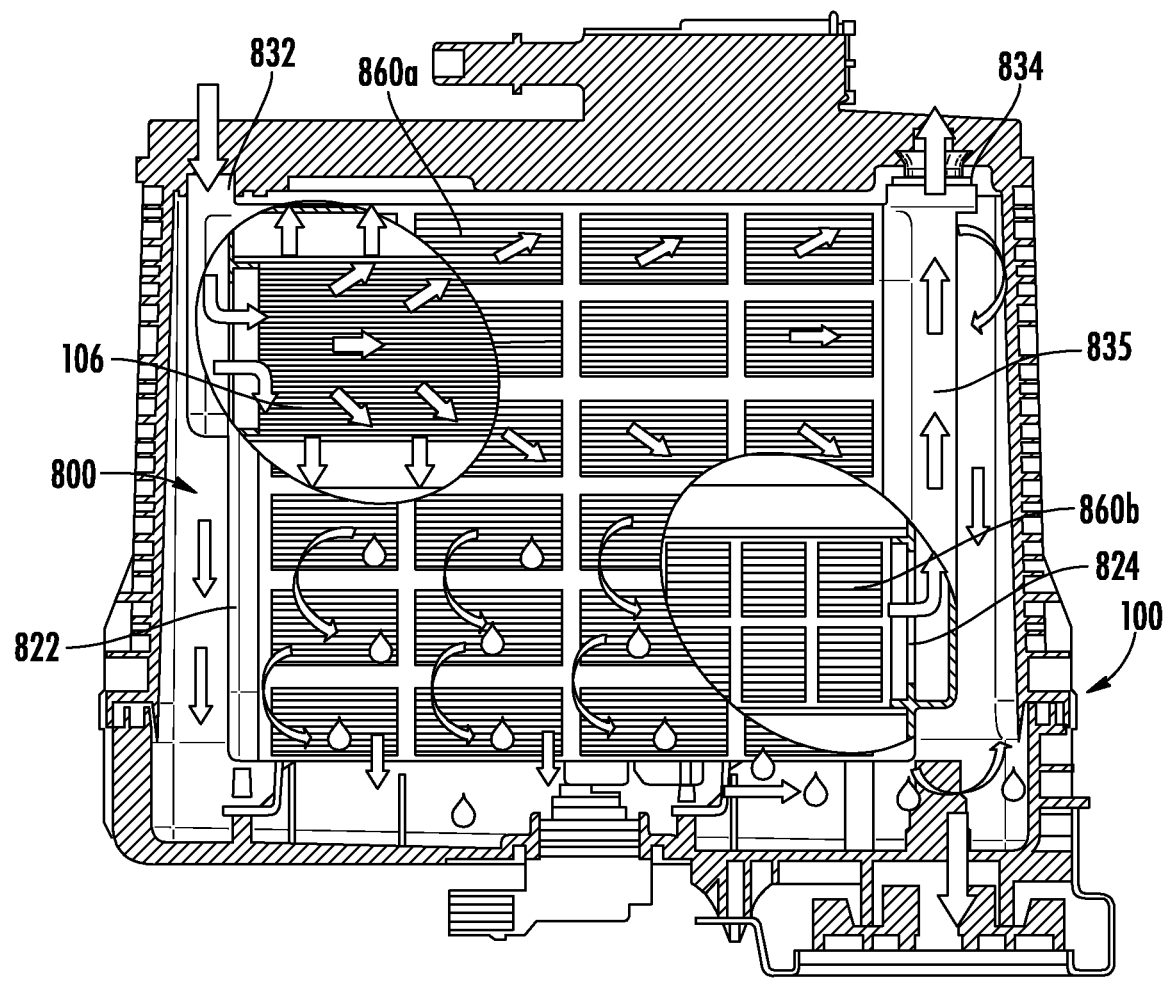
FIG. 29 is a rear cross-sectional view of the filter element of FIG. 28 disposed within the housing and showing the direction of fluid flow.

As shown in FIGS. 28-29, an eighth embodiment of a filter element 800 includes a frame 820 comprising vertical influent (first) and effluent (second) endcaps 822, 824 that are substantially similar to the influent and effluent endcaps 522, 524 of the fifth embodiment of the filter element 500 and separate horizontally oriented influent and effluent obround rings of pleated filter media 862a, 862b substantially similar to the seventh embodiment of the filter element 700. Each of the influent and effluent filter medias 860a, 860b are oriented 90° relative to the influent and effluent filter medias 760a, 760b of the seventh embodiment. The influent and effluent filter media 860a, 860b can be selected to cooperatively remove particulates and separate water from fuel flowing through the filter element 800. In this arrangement, dirty wet fuel enters a dirty wet fuel region 106 defined by the influent filter media 860a as shown in FIG. 29. The influent filter media 860a separates particulate and coalesces water from the fuel. Fuel flows radially inward through effluent filter media 860b, which is provided with a hydrophobic treatment or surrounded by a hydrophobic mesh to separate water. Clean dry fuel then fills an outlet passage 835 defined by the effluent endcap 824 and flows out of the filter element 800 through a clean fuel outlet 834 of the filter element 800. The clean fuel outlet 834 may be provided with an outlet tube and air management features as described above.

There are numerous substitutes for the materials and methods of construction mentioned above that are contemplated as compatible with the disclosed filter elements. When manufacturing and assembling some or all of the embodiments at a high volume, some methods of manufacture and assembly may include robotics, gantry mounted adhesive dispensing, and/or direct embedding equipment. Further, these methods may be used in combination with other known methods of manufacture and assembly.

What is claimed:

1. A filter element for use in a housing of a filter assembly comprising:
    an obround ring of filter media defining an obround filtration space and extending axially between a first obround endcap and a second obround endcap, said first obround endcap defining a fluid inlet, and a fluid outlet;
    an obround insert received in the first obround endcap, wherein a fluid flow path is defined between said obround insert and said first obround endcap, said fluid flow path is in communication with the fluid inlet and said obround filtration space;
    a water separator disposed externally to the obround ring of filter media, said water separator including an outlet tube at least partially surrounded by a hydrophobic mesh;
    a peripheral wrapper extending between the first and second obround endcaps, said peripheral wrapper comprising a grid of ribs surrounding the obround ring of filter media and the water separator; and wherein, unfiltered fluid is delivered to the filter element through the fluid inlet, flows through the fluid flow path into the obround filtration space, unfiltered fluid flows radially outward through the obround ring of filter media coalescing water and separating particulates from the fluid to form filtered fluid and coalesced water, said filtered fluid flows through the hydrophobic mesh into said water separator, separating said coalesced water from the filtered fluid to form filtered dry fluid, and said filtered dry fluid flows through the outlet tube to exit the filter element.

2. The filter element of claim 1, wherein the first obround endcap includes stand-offs between the first obround end cap and the obround insert to maintain the obround insert in a spaced apart relationship to the first obround end cap.

3. The filter element of claim 1, wherein the water separator includes an outlet tube extending from said fluid outlet to a free end in said water separator, said outlet tube defining a clean fuel outlet extending from said free end, and including one or more air bleed holes axially spaced from said free end and communicating with said clean fuel outlet.

4. The filter element of claim 1, wherein the first obround endcap includes an air management aperture defined by an air management post projecting from an inside surface of the first obround endcap, said air management aperture extending through said first obround end cap.

5. The filter element of claim 1, wherein the obround insert includes an obround inner rim axially projecting toward said ring of filter media, said inner rim defining a distribution channel open to said obround filtration space, said obround insert defining at least one opening between said fluid flow path and said distribution channel.

6. The filter element of claim 1, wherein the second endcap includes one or more engagement hooks for engagement with complementary structures on a filter housing.

7. The filter element of claim 1, wherein at least one of the first obround end cap, second obround end cap, peripheral wrapper, and the ring of filter media includes a conductive or electrostatically conductive material.

8. The filter element of claim 1, wherein said hydrophobic mesh defines a clean dry fuel region surrounding said outlet tube and bounded by the obround endcap insert, the second obround endcap and the hydrophobic mesh, said clean dry fuel region in communication with said fluid outlet and isolated from said fluid flow path.

* * * * *